United States Patent
Kim et al.

(10) Patent No.: US 10,545,605 B2
(45) Date of Patent: Jan. 28, 2020

(54) ELECTRONIC DEVICE HAVING INPUT SENSING PANELS AND METHOD

(71) Applicant: Samsung Electronics Co., Ltd., Gyeonggi-do (KR)

(72) Inventors: Jin-Man Kim, Gyeongsangbuk-do (KR); Min Uk Kim, Gyeonggi-do (KR); Kyungok Jang, Daegu (KR); Youngho Cho, Seoul (KR); Ju-Hee Han, Gyeonggi-do (KR); Ji-Woo Lee, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/646,796

(22) Filed: Jul. 11, 2017

(65) Prior Publication Data

US 2018/0032202 A1 Feb. 1, 2018

(30) Foreign Application Priority Data

Jul. 27, 2016 (KR) .................. 10-2016-0095363

(51) Int. Cl.
*G06F 3/041* (2006.01)
*G06K 9/00* (2006.01)
*G06F 3/044* (2006.01)
*G06F 3/046* (2006.01)

(52) U.S. Cl.
CPC .......... *G06F 3/0416* (2013.01); *G06F 3/0412* (2013.01); *G06K 9/00013* (2013.01); *G06K 9/00087* (2013.01); *G06F 3/044* (2013.01); *G06F 3/046* (2013.01); *G06F 3/0414* (2013.01)

(58) Field of Classification Search
None
See application file for complete search history.

(56) References Cited

U.S. PATENT DOCUMENTS

| 9,329,718 | B2 | 5/2016 | Kim |
| 2008/0192158 | A1* | 8/2008 | Yoshihara ........... G02F 1/13471 349/33 |
| 2011/0216082 | A1 | 9/2011 | Caskey et al. |

(Continued)

FOREIGN PATENT DOCUMENTS

| KR | 20150027529 | 3/2015 |
| KR | 20150081753 | 7/2015 |
| KR | 20150085996 | 7/2015 |

OTHER PUBLICATIONS

International Search Report dated Oct. 20, 2017 issued in counterpart application No. PCT/KR2017/007279, 11 pages.

(Continued)

*Primary Examiner* — Parul H Gupta
(74) *Attorney, Agent, or Firm* — The Farrell Law Firm, P.C.

(57) ABSTRACT

An electronic device is provided. The electronic device includes a display panel, a plurality of input sensing panels which are one of layered on and bonded to the display panel, a driver integrated circuit (IC) connected to the display panel and configured to generate a synchronization signal for controlling the display panel, and a plurality of input sensors connected to the plurality of input sensing panels and configured to scan a respective one of the plurality of input sensing panels, according to scan timing, which is time-divided with reference to the synchronization signal.

18 Claims, 18 Drawing Sheets

(56) References Cited

U.S. PATENT DOCUMENTS

| | | | |
|---|---|---|---|
| 2013/0278525 A1 | 10/2013 | Lim et al. | |
| 2014/0176495 A1* | 6/2014 | Vlasov | G06F 3/03545 345/174 |
| 2015/0062062 A1 | 3/2015 | Han et al. | |
| 2015/0145819 A1* | 5/2015 | Bae | G06F 3/0416 345/174 |
| 2015/0154730 A1* | 6/2015 | Hirakata | G06T 1/20 345/520 |
| 2015/0207493 A1 | 7/2015 | Han et al. | |
| 2016/0092010 A1 | 3/2016 | Agarwal et al. | |
| 2016/0216833 A1* | 7/2016 | Butler | G06F 3/0412 |
| 2016/0299598 A1* | 10/2016 | Yoon | G06F 3/044 |
| 2016/0328086 A1* | 11/2016 | Lee | G06F 3/0412 |
| 2017/0090615 A1* | 3/2017 | Bohannon | G06F 3/044 |
| 2018/0329561 A1* | 11/2018 | Kim | G06F 3/0414 |

OTHER PUBLICATIONS

European Search Report dated Jun. 24, 2019 issued in counterpart application No. 17834664.9-1221, 8 pages.

\* cited by examiner

ELECTRONIC DEVICE HAVING INPUT SENSING PANELS AND METHOD

PRIORITY

The present application claims priority under 35 U.S.C. § 119(a) to Korean Patent Application Serial No. 10-2016-0095363, which was filed in the Korean Intellectual Property Office on Jul. 27, 2016, the contents of which are incorporated herein by reference.

BACKGROUND

1. Field of the Disclosure

The present disclosure relates, generally, to an electronic device, and more particularly, to an electronic device having input sensing panels.

2. Description of the Related Art

Electronic devices (e.g., mobile terminals) can provide various functions, including an Internet access function, a music or video replay function, a capturing function, a navigation function, a messenger function, etc., in addition to a basic voice communication function. The electronic devices may also include various input sensing panels such as a touch screen panel (TSP), a digitizer panel, a force touch panel, etc. The input sensing panels may be layered on or bonded to a display panel.

SUMMARY

The input sensing panels may be influenced by an operating frequency and a data signal of the display panel since they are disposed adjacent to the display panel. For example, when the display panel operates, the operating frequency and a harmonic signal of the data signal may flow into the plurality of input sensing panels, which may cause noise, which may cause the input sensing panels to malfunction (e.g., a ghost touch), and fail to recognize a touch. In addition to the relative spacing between the display panel and the input sensing panels, when the temperature of the display panel increases, the harmonic signal may increase, which, in turn, may increase the noise.

In recent years, as the electronic devices have become slimmer, noise has become a greater issue.

Aspects of the present disclosure have been made to address at least the above-mentioned problems and/or disadvantages and to provide at least the advantages described below. Accordingly, the present disclosure may provide an electronic device which can reduce the influence of an operating frequency and a data signal of a display panel on input sensing panels, and a method thereof.

Another aspect of the present disclosure may provide an electronic device which can prevent the influence of a display panel by synchronizing a vertical synchronization signal and/or a horizontal synchronization signal for controlling the display panel and sensing (or scanning) operations of input sensing panels, and a method thereof.

Another aspect of the present disclosure may provide an electronic device which can minimize a frequency interference between a plurality of input sensing panels by time-dividing a scan time of the plurality of input sensing panels (e.g., input sensing panels having adjacent operating frequencies), and a method thereof.

In accordance with an embodiment of the present disclosure, there is provided an electronic device. The electronic device includes a display panel, a plurality of input sensing panels which are one of layered on and bonded to the display panel, a driver integrated circuit (IC) connected to the display panel and configured to generate a synchronization signal for controlling the display panel, and a plurality of input sensors connected to the plurality of input sensing panels and configured to scan a respective one of the plurality of input sensing panels, according to scan timing, which is time-divided with reference to the synchronization signal.

In accordance with an embodiments of the present disclosure, there is provided a method for operating an electronic device. The method includes detecting an activation of a display module where a display panel and a plurality of input sensing panels are one of layered and bonded and scanning the plurality of input sensing panels according to scan timing, which is time-divided with reference to a synchronization signal, for controlling the display panel.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1A:
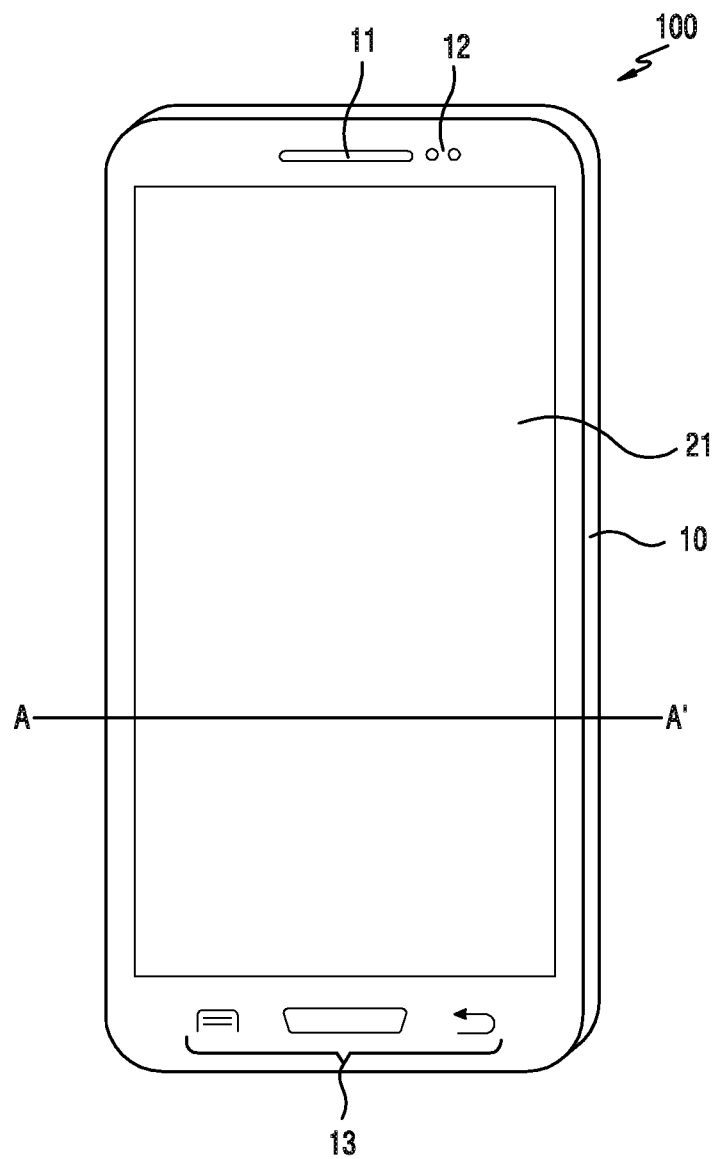
FIG. 1A is a diagram showing an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance, and do not limit corresponding elements. The expressions may be used for distinguishing one element from another element. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only mean "specifically designed to" by hardware. Alternatively, in some situations, the expression "apparatus configured to" may mean that the apparatus "can" operate together with another apparatus or component. For example, the phrase "a processor configured (or set) to perform A, B, and C" may be a generic-purpose processor (such as a central processing unit (CPU) or an application processor (AP)) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet PC, a mobile phone, a video phone, an e-book reader, a desktop PC, a laptop PC, a netbook computer, a workstation, a server, a PDA, a portable multimedia player (PMP), an MPEG 3 (MP3) player, medical equipment, a camera, and a wearable device. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler).

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

Figure 1B:
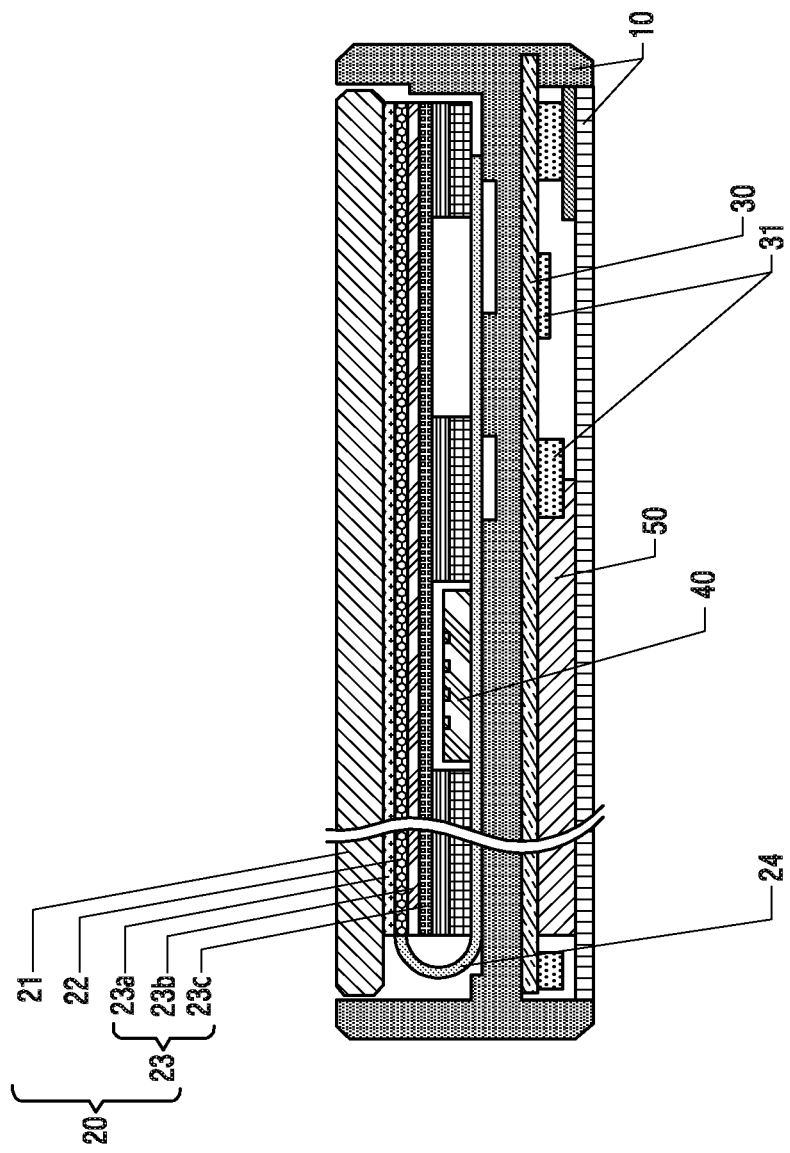
FIG. 1B is a cross section view of the electronic device of FIG. 1A taken along line A-A', according to an embodiment of the present disclosure.

FIG. 1A is a diagram of an electronic device, according to an embodiment of the present disclosure, and FIG. 1B is a cross section view of the electronic device of FIG. 1A taken along line A-A'.

Referring to FIGS. 1A and 1B, the electronic device 100 includes a housing 10, a display module 20, a printed circuit board (PCB) 30, a fingerprint recognition sensor 40, and a battery 50.

The housing 10 may include a first surface facing in a first direction and a second surface facing in a second direction opposite to the first direction. For example, the first surface may be a front surface of the electronic device 100 and the second surface may be a rear surface of the electronic device 100. A speaker 11, an illuminance sensor 12, a plurality of keys 13, and a protection window 21 are disposed on the first surface.

The display module 20 includes the protection window 21, a display panel 22, and a plurality of input sensing panels 23. The protection window 21 may protect the display panel 22 and the plurality of input sensing panels 23. The protection window 21 may be formed of a transparent material (e.g., glass).

The display panel 22 may be formed of a liquid crystal display (LCD), a light emitting diode (LED) display, an organic LED (OLED) display, or a micro electro mechanical system (MEMS) display, etc. The display panel 22 may be implemented to be flexible, transparent, or wearable. The display panel 22 may display various contents (e.g., a text, an image, a video, an icon, and/or symbol), and the display panel 22 may be electrically connected with the PCB 30 through a flexible PCB 24.

The display panel 22 may be driven by a driver integrated circuit (IC), which may control various operations for displaying an image on the display panel 22. For example, the driver IC may generate a horizontal synchronization signal (Hsync) and a vertical synchronization signal (Vsync). The driver IC may also generate a tearing effect signal. The horizontal synchronization signal, the vertical synchronization signal, and the tearing effect signal may be referred to as a synchronization signal, and the driver IC may be referred to as an LCD driver IC (LDI).

The input sensing panels 23 may sense a user input. For example, the input sensing panels 23 may include a touch screen panel 23a, a digitizer panel 23b, and a force touch panel 23c. In FIG. 1B, the input sensing panels 23 include three input sensing panels, but the electronic device 100 may include at least two input sensing panels from among the touch screen panel 23a, the digitizer panel 23b, and the force touch panel 23c. In addition, the electronic device 100 may further include another input sensing panel (e.g., an ultrasonic touch panel, a fingerprint recognition panel, etc.), which is the same as the input sensing panel 23.

The touch screen panel 23a may sense an input that is made by a user's finger, and the touch screen panel 23a may be a touch panel of a capacitive method. The digitizer panel 23b may sense an input that is made by an electronic pen generating a specific frequency signal, and the digitizer panel 23b may be a touch panel of an electromagnetic induction method. The force touch panel 23c may sense a force that which is inputted onto the display panel, and the force touch panel 23c may be formed in the capacitive method; however, the force touch panel 23c may have a different structure from that of the touch screen panel 23a.

The input sensing panels 23 may be layered on or bonded to the display panel 22. The order of layering or bonding the input sensing panels 23 may be changed.

The input sensing panels 23 may be scanned according to scan timing which is time-divided with reference to a synchronization signal (e.g., a vertical synchronization signal, a horizontal synchronization signal, and a tearing effect signal) for driving the display panel 22.

The PCB 30 may have at least one component 31 (e.g., an application processor, a communication processor, a memory, a resistance, a capacitor, an inductor, or the like) mounted therein.

The fingerprint recognition sensor 40 may recognize a user's fingerprint, and the fingerprint recognition sensor 40 may be formed in an ultrasonic method or an optical sensing method. The fingerprint recognition sensor 40 may be disposed adjacent to the display panel 22. The fingerprint recognition sensor 40 may operate at a similar operating frequency to the operating frequency of the display panel 22 or the input sensing panels 23. The fingerprint recognition sensor 40 may operate according to scan timing which is time-divided with reference to the synchronization signal for driving the display panel 22.

The fingerprint recognition sensor 40 may be in the form of a panel and may be layered on or bonded to the display panel 22.

The battery 50 may provide power to drive the electronic device 100. The battery 50 may be a secondary battery (e.g., a lithium-ion battery) which is rechargeable.

In FIG. 1A, the plurality of keys are separated from a display region, but the plurality of keys may be soft keys. In FIG. 1A, the electronic device 100 is a bar type, but may have various types such as a folder type, a slide type, or the like. In addition, the electronic device 100 may be foldable or flexible.

Figure 2A:
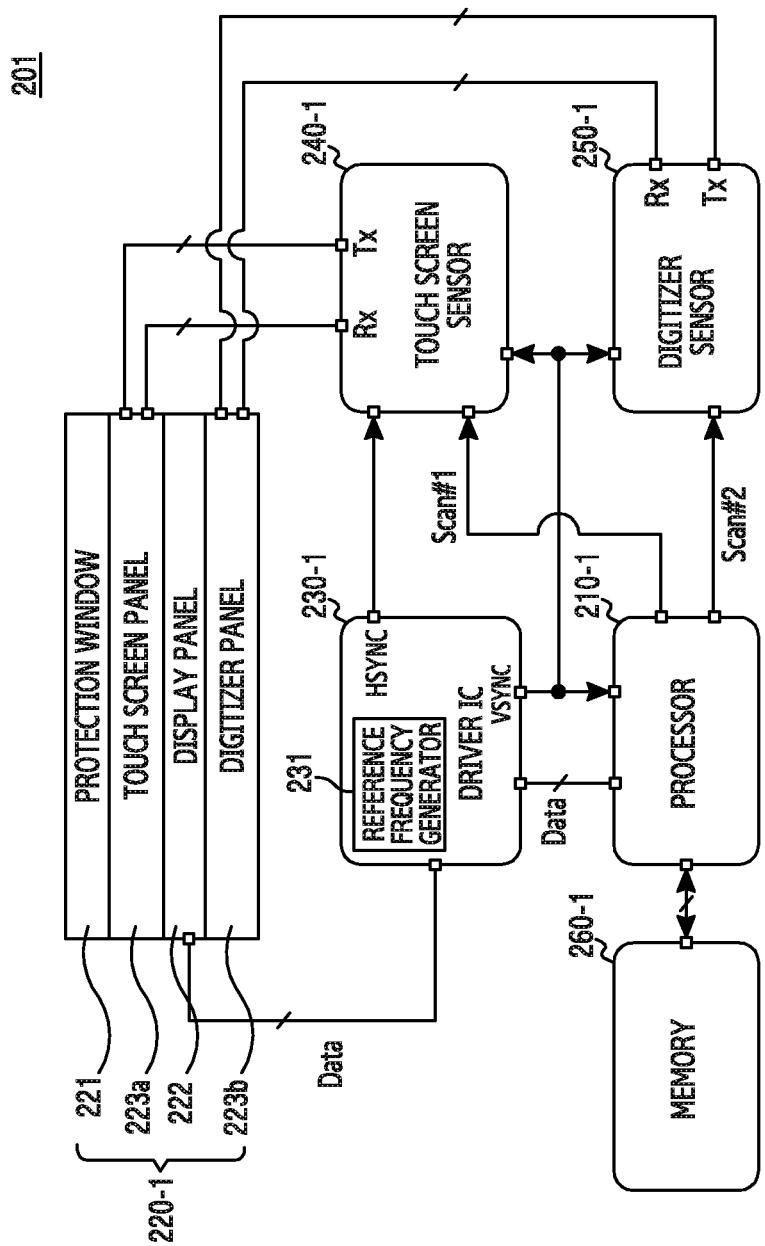
FIG. 2A is a diagram showing a configuration of an electronic device, according to an embodiment of the present disclosure.

FIG. 2A is a diagram of an electronic device, according to an embodiment of the present disclosure.

Referring to FIG. 2A, the electronic device 201 (e.g., the electronic device 100 of FIG. 1A) includes a processor 210-1, a display module 220-1, a driver IC 230-1, a touch screen sensor 240-1, a digitizer sensor 250-1, and a memory 260-1.

The processor 210-1 may control an overall operation of the electronic device 201. In addition, the processor 210-1 may control the elements of the electronic device 201. For example, the processor 210-1 may receive instructions from the memory 260-1, and may control the respective elements according to the received instructions to perform various functions.

The processor 210-1 may be implemented to a central processing unit (CPU), an application processor (AP), a micro control unit (MCU), etc. The processor 210-1 may be implemented to a single core processor or a multi-core processor. Alternatively, the processor 210-1 may be a multi-processor formed of a plurality of processors. For example, the processor 210-1 may be a multi-processor which includes an application processor (AP) and a communication processor (CP).

The processor 210-1 may control the driver IC 230-1 to display an image on a display panel 222. The processor 210-1 may transmit, to the driver IC 230-1, image data corresponding to the image to be displayed on the display panel 222. The processor 210-1 may transmit the image data to the driver IC 230-1 via a mobile industry processor interface (MIPI).

The processor 210-1 may control the touch screen sensor 240-1 and the digitizer sensor 250-1 to sense a user input. The processor 210-1 may transmit scan commands (Scan #1 and Scan #2) to the touch screen sensor 240-1 and the digitizer sensor 250-1, respectively. The processor 210-1 may transmit the scan commands to the touch screen sensor 240-1 and the digitizer sensor 250-1, respectively, via an inter integrated circuit (I2C).

When the processor 210-1 receives a Vsync from the driver IC 230-1, the processor 210-1 may transmit the scan commands to the touch screen sensor 240-1 and the digitizer sensor 250-1, respectively. The processor 210-1 may extract setting information (scan parameter) for scanning by the touch screen sensor 240-1 and the digitizer sensor 250-1 from the memory 260-1, and may transmit the scan commands to the touch screen sensor 240-1 and the digitizer sensor 250-1 according to the setting information.

The display module 220-1 may include a protection window 221, a display panel 222, a touch screen panel 223a, and a digitizer panel 223b. The display module 220-1 operates similar to the display module 20 that has been described in FIGS. 1A and 1B, and thus a further description of the display module 220-1 will be omitted.

The driver IC 230-1 may control operations for displaying an image on the display panel 222. The driver IC 230-1 may generate a horizontal synchronization signal and a vertical synchronization signal. To achieve this, the driver IC 230-1 may include a reference frequency generator 231. The reference frequency generator 231 may be an oscillator. The driver IC 230-1 may generate the vertical synchronization signal and the horizontal synchronization signal by multiplying or dividing the frequency of the reference frequency generator 231.

The driver IC 230-1 may transmit the vertical synchronization signal to the processor 210-1, the touch screen sensor 240-1, and the digitizer sensor 250-1, which, in turn, causes the touch screen sensor 240-1 and the digitizer sensor 250-1 to perform a scan operation with reference to the Vsync. In addition, the driver IC 230-1 may transmit the Hsync to the touch screen sensor 240-1, which, in turn, causes the touch screen sensor 240-1 to perform a scan operation with reference to the Hsync.

When the touch screen sensor 240-1 is set to be synchronized with both the Vsync and the Hsync and to perform the scan operation, the driver IC 230-1 may transmit the Vsync and the Hsync to the touch screen sensor 240-1. The touch screen sensor 240-1 may be synchronized with the horizontal synchronization signal and may perform the scan operation during a scan time which is time-divided based on the vertical synchronization signal and allocated.

When the touch screen sensor 240-1 is set to perform the scan operation with reference to only the horizontal synchronization signal, the driver IC 230-1 may not transmit the Vsync to the touch screen sensor 240-1. Alternatively, even when the touch screen sensor 240-1 receives the Vsync from the driver IC 230-1, the touch screen sensor 240-1 may disregard the Vsync.

The touch screen sensor 240-1 may sense a user input which is inputted onto the touch screen panel 223a. The touch screen sensor 240-1 may sense (or recognize) various touch inputs (e.g., a tap, a double tap, a touch, a touch movement (a drag, a flick, or the like), a multi-touch, hovering, or the like) which are made by using an input tool such as a finger, a stylus, or the like. The touch screen sensor 240-1 may be a touch sensor of a capacitive method. The touch screen sensor 240-1 may sense a change in capacitance of a reception channel (Rx) and a transmission channel (Tx) connected with the touch screen panel 223a. The reception channel may be formed of N channels (e.g., Rx_1, Rx_2, . . . , Rx_N). In addition, the transmission channel may be formed of N channels (for example, Tx_1, Tx_2, . . . , Tx_N). The number of the Rx channels may be different from the number of the Tx channels.

The touch screen sensor 240-1 may enter a scan standby mode when the vertical synchronization signal is inputted from the driver IC 230-1, and may scan the Rx and the Tx and sense a change in the capacitance of each channel when the first scan command is received from the processor 210-1. The touch screen sensor 240-1 may receive the vertical synchronization signal via a general purpose input/output (GPIO) port.

The touch screen sensor 240-1 may enter the scan standby mode when the horizontal synchronization signal is inputted from the driver IC 230-1, and may scan the Rx and the Tx when the first scan command is received from the processor 210-1.

The digitizer sensor 250-1 may sense a user input which is inputted onto the digitizer panel 223b. The digitizer sensor 250-1 may sense (or recognize) various touch inputs (e.g., a tap, a double tap, a touch, a touch movement (a drag, a flick, etc.), hovering, etc.) which are made by using an electronic pen including a coil for generating a specific frequency.

The digitizer sensor 250-1 may be a sensor of an electromagnetic induction method. The digitizer sensor 250-1 may sense a change in a frequency of the Rx and the Tx connected with the digitizer panel 223b. The reception channel may be formed of N channels (for example, Rx_1, Rx_2, . . . , Rx_N). In addition, the transmission channel may be formed of N channels (for example, Tx_1, Tx_2, . . . , Tx_N). The number of the Rx channels may be different from the number of the Tx channels.

The digitizer sensor 250-1 may enter the scan standby mode when the vertical synchronization signal is inputted from the driver IC 230-1, and may scan the Rx and the Tx and sense a change in the frequency of each channel when the second scan command is received from the processor 210-1. The digitizer sensor 250-1 may receive the vertical synchronization signal from the driver IC 230-1 via the GPIO port.

The memory 260-1 may store various programs for operating the electronic device 201, and store data which is generated or downloaded while the various programs are being performed. In addition, the memory 260-1 may store various commands and/or instructions for operating the processor 210-1. The memory 260-1 may include at least one of an internal memory or an external memory. The internal memory may include at least one of a volatile memory (e.g., a dynamic random access memory (DRAM), a static random access memory (SRAM), an SDRAM, etc.), a nonvolatile memory (e.g., an one time programmable read only memory (OTPROM)), a PROM, an erasable PROM (EPROM), an electrically EPROM (EEPROM), a mask ROM, a flash ROM, a flash memory, a hard driver, or a solid state driver (SSD). The external memory may include at least one of a flash drive, a compact flash (CF), a secure digital (SD), a micro-SD, a mini-SD, an extreme digital (xD), a multi-media card (MMC), and a memory stick.

The memory 260-1 may store programs for controlling driving of the display panel 222 and the plurality of input sensing panels 223a and 223b. The memory 260-1 may store setting information (or scan parameter) for driving the display panel 222 and the plurality of input sensing panels 223a and 223b. The setting information may include a delay time, a scan time, a waiting time, or the like. The memory 260-1 may store setting information for each scan mode when the input sensing panels have a plurality of scan modes.

Although not shown in FIG. 2A, some of the elements may not be included in the electronic device 201. Alternatively, the electronic device 201 may further include various elements which are the same as the above-described elements (e.g., a sensor module, an audio processor, a camera, a communication module (e.g., a USB communication module, a wireless fidelity (Wi-Fi) communication module, a Bluetooth (BT) communication module, a near field communication (NFC) module, etc.), a global positioning system (GPS) module, etc.).

Figure 2B:
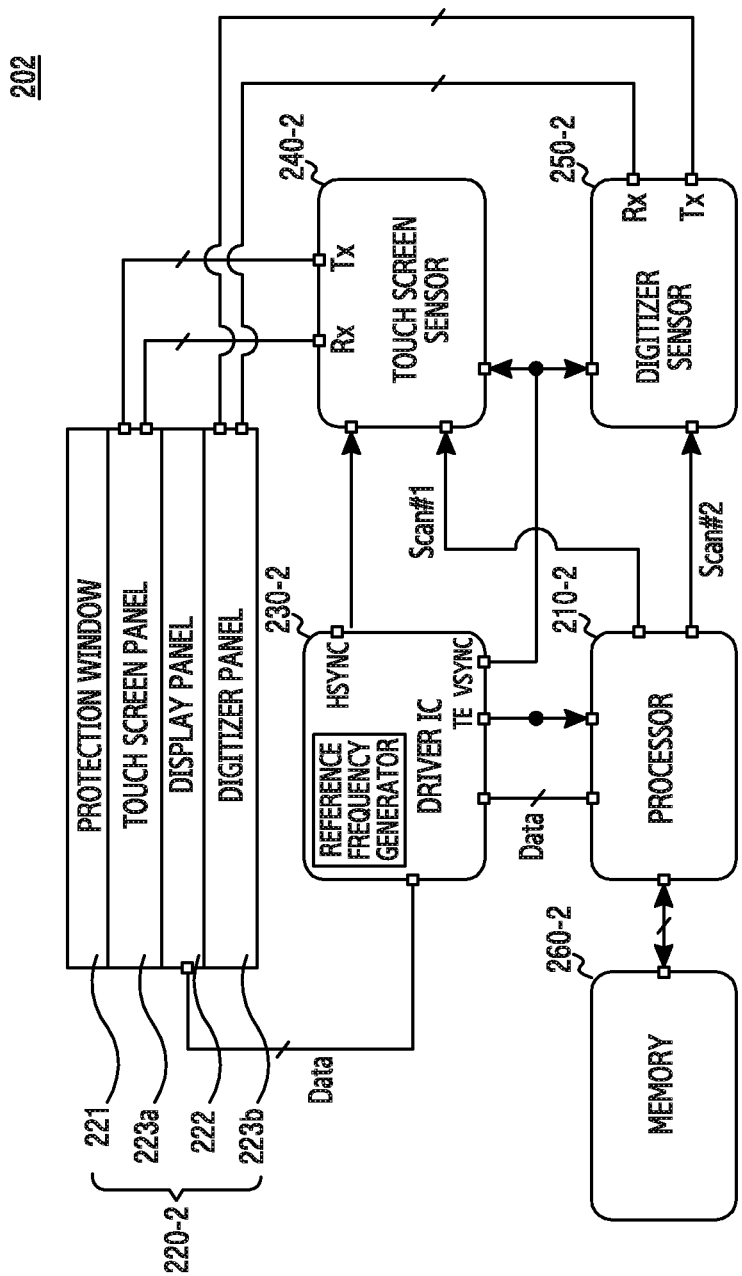
FIG. 2B is a diagram showing a configuration of an electronic device, according to an embodiment of the present disclosure.

FIG. 2B is a diagram of an electronic device, according to an embodiment of the present disclosure.

Referring to FIG. 2B, the electronic device 202 (e.g., the electronic device 100 of FIG. 1A) includes a processor 210-2, a display module 220-2, a driver IC 230-2, a touch screen sensor 240-2, a digitizer sensor 250-2, and a memory 260-2.

The electronic device 202 of FIG. 2B is similar to the electronic device 201 of FIG. 2A; however, the driver IC 230-2 transmits the Vsync to the touch screen 240-2 and the digitizer sensor 250-2, and may not transmit the Vsync signal to the processor 210-2. The driver IC 230-2 may transmit the TE signal to the processor 210-2. The driver IC 230-2 may generate the TE signal which is the same as the Vsync, but is earlier than the Vsync, and transmit the TE signal to the processor 210-2. When the processor 210-2 receives the TE signal, the processor 210-2 may generate scan commands (Scan #1 and Scan #2) and transmit the scan commands to the touch screen sensor 240-2 and the digitizer sensor 250-2, respectively.

The display module 220-2, the touch screen sensor 240-2, the digitizer sensor 250-2, and the memory 260-2 may perform similar or same functions as or to those of the display module 220-1, the touch screen sensor 240-1, the digitizer sensor 250-1, and the memory 260-1 of FIG. 2A. Accordingly, a detailed description thereof will be omitted.

Figure 2C:
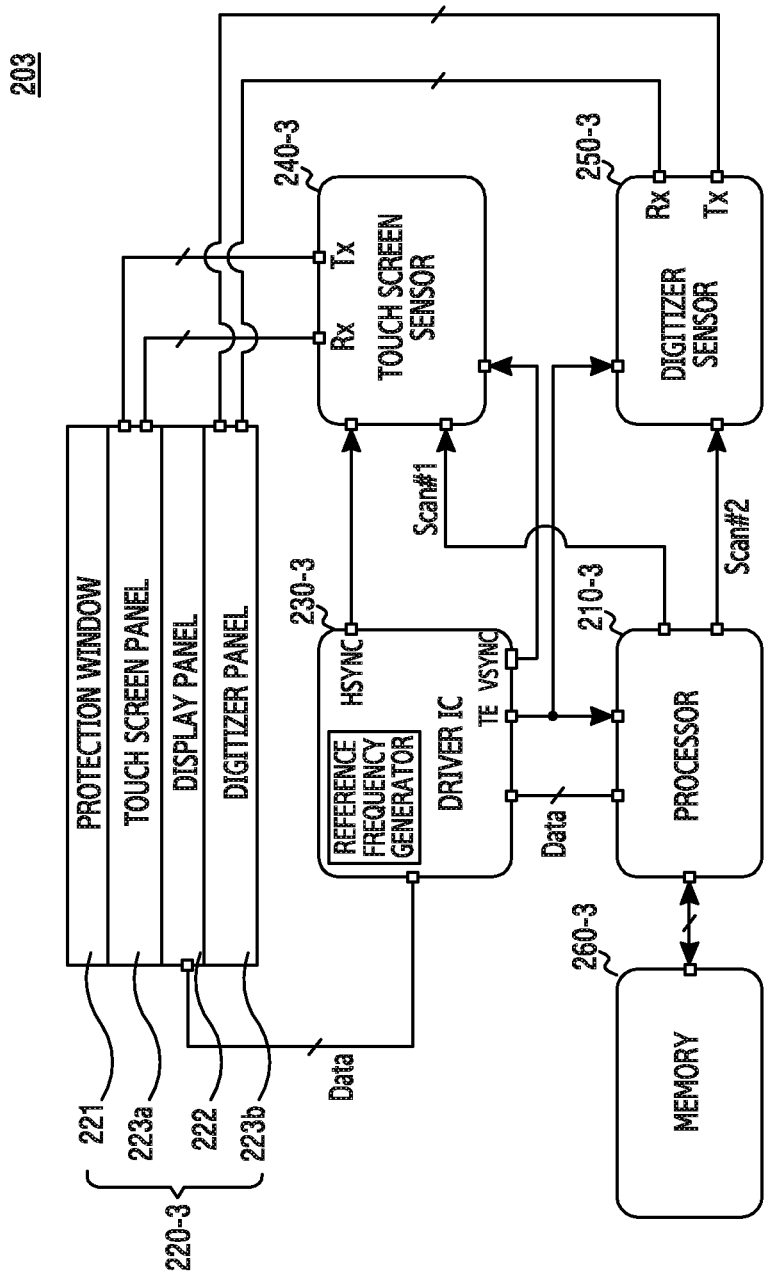
FIG. 2C is a diagram showing a configuration of an electronic device, according to an embodiment of the present disclosure.

FIG. 2C is a diagram of an electronic device, according to an embodiment of the present disclosure.

Referring to FIG. 2C, the electronic device 203 (e.g., the electronic device 100 of FIG. 1A) includes a processor 210-3, a display module 220-3, a driver IC 230-3, a touch screen sensor 240-3, a digitizer sensor 250-3, and a memory 260-3.

The electronic device 203 of FIG. 2C is similar to the electronic device 202 of FIG. 2B; however, the driver IC 230-3 may transmit the Vsync to the touch screen sensor 240-3 and may not transmit the Vsync to the digitizer sensor 250-3. In addition, the driver IC 230-3 may transmit a TE signal to the processor 210-3 and the digitizer sensor 250-3.

When the processor 210-3 receives a TE signal, the processor 210-3 may generate a first scan command and a second scan command and transmit the first scan command and the second scan command to the touch screen sensor 240-3 and the digitizer sensor 250-3, respectively. When the touch screen sensor 240-3 receives the first scan command, the touch screen sensor 240-3 may perform a scan operation according to the first scan command with reference to the Vsync. When the digitizer sensor 250-3 receives the second scan command, the digitizer sensor 250-3 may perform a scan operation according to the second scan command with reference to the TE signal.

The display module 220-3, the touch screen sensor 240-3, the digitizer sensor 250-3, and the memory 260-3 may perform similar or same functions to or as those of the display module 220-1, the touch screen sensor 240-1, the digitizer sensor 250-1, and the memory 260-1 of FIG. 2A. Accordingly, a detailed description thereof will be omitted.

FIGS. 3A to 3D are graphs showing scan timing of input sensing panels of an electronic device, according to an embodiment of the present disclosure. The graphs of FIGS. 3A to 3D are illustrated with reference to the electronic device 203 of FIG. 2C. The digitizer sensor 250-3 may have a plurality of scan modes. The digitizer sensor 250-3 may have a global mode, a global XY mode, a local scan mode, and a full scan mode.

Figure 3A:
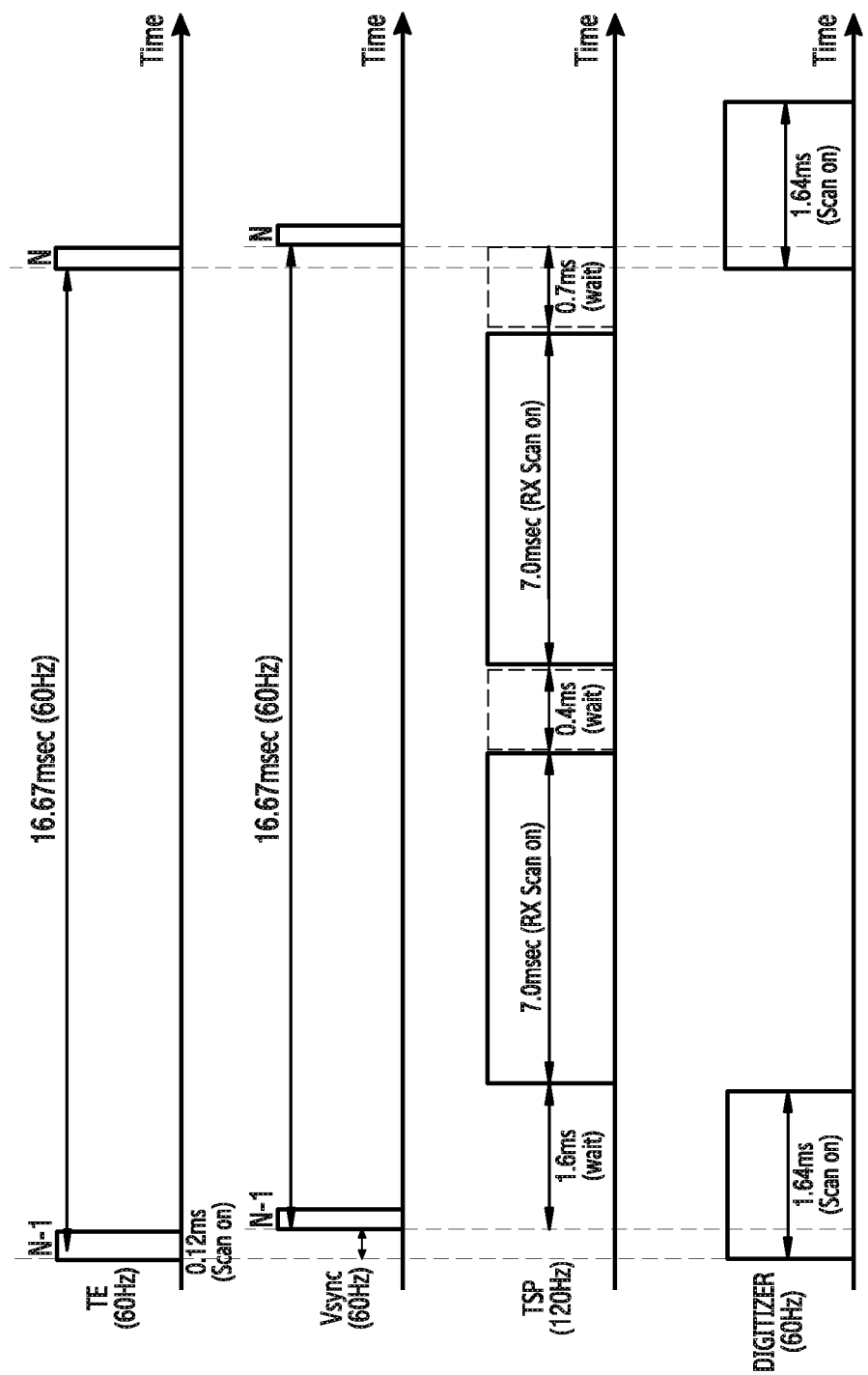
FIG. 3A is a diagram of a method for scanning input sensing panels of an electronic device, according to an embodiment of the present disclosure.

FIG. 3A is a graph showing scan timing when the digitizer sensor 250-3 operates in the global mode. When the display panel 222 is activated, the driver IC 230-3 may generate a TE signal and transmit the TE signal to the processor 210-3 and the digitizer sensor 250-3. In addition, the driver IC 230-3 may transmit the Vsync to the touch screen sensor 240-3 after 0.12 msec. The TE signal and the Vsync may have a frequency of 60 Hz and may have a period of 16.67 msec (=1/60).

When the TE signal is received, the processor 210-3 may transmit a first scan command and a second scan command to the touch screen sensor 240-3 and the digitizer sensor 250-3, respectively. The first scan command may include a delay time, a first scan time, a first waiting time, a second scan time, and a second waiting time. For example, the processor 210-3 may transmit, to the touch screen sensor 240-3, the first scan command including the delay time (for example, 1.6 msec), the first scan time (for example, 7.0 msec), the first waiting time (e.g., 0.4 msec), the second scan time (e.g., 7.0 msec), and the second waiting time (e.g., 0.7 msec). The touch screen sensor 240-3 which receives the first scan command may wait as much time as the delay time from the time of receiving the Vsync, may scan a capacitance change sensed on the touch screen panel 223a during the first scan time, may wait as much time as the first waiting time, and then may scan a capacitance change during the second scan time. As described above, when the digitizer sensor 250-3 operates in the global mode, the touch screen sensor 240-3 may perform a scan operation two times during one period of the Vsync.

In addition, the processor 210-3 may transmit, to the digitizer sensor 250-3, the second scan command to scan a frequency change sensed on the digitizer panel 223b during a third scan time (e.g., 1.64 msec) without a waiting time. When the second scan command is received, the digitizer sensor 250-3 may scan the frequency change during the third scan time from the time of receiving the TE signal.

As described above, the electronic device 203 may synchronize the input sensing panels with the Vsync and the TE signal, and may control the plurality of input sensing panels to scan at different times. Accordingly, the electronic device 203 can minimize (or prevent) the influence of a harmonic signal caused by driving of the display panel 222. In addition, the plurality of input sensing panels scan at different times, such that a frequency interference occurring between the input sensing panels can be minimized (or prevented).

The digitizer sensor 250-3 may scan first and then the touch screen sensor 240-3 may scan; this is because the digitizer sensor 250-3 is relatively less influenced by the harmonic signal caused by driving of the display panel 222.

Figure 3B:
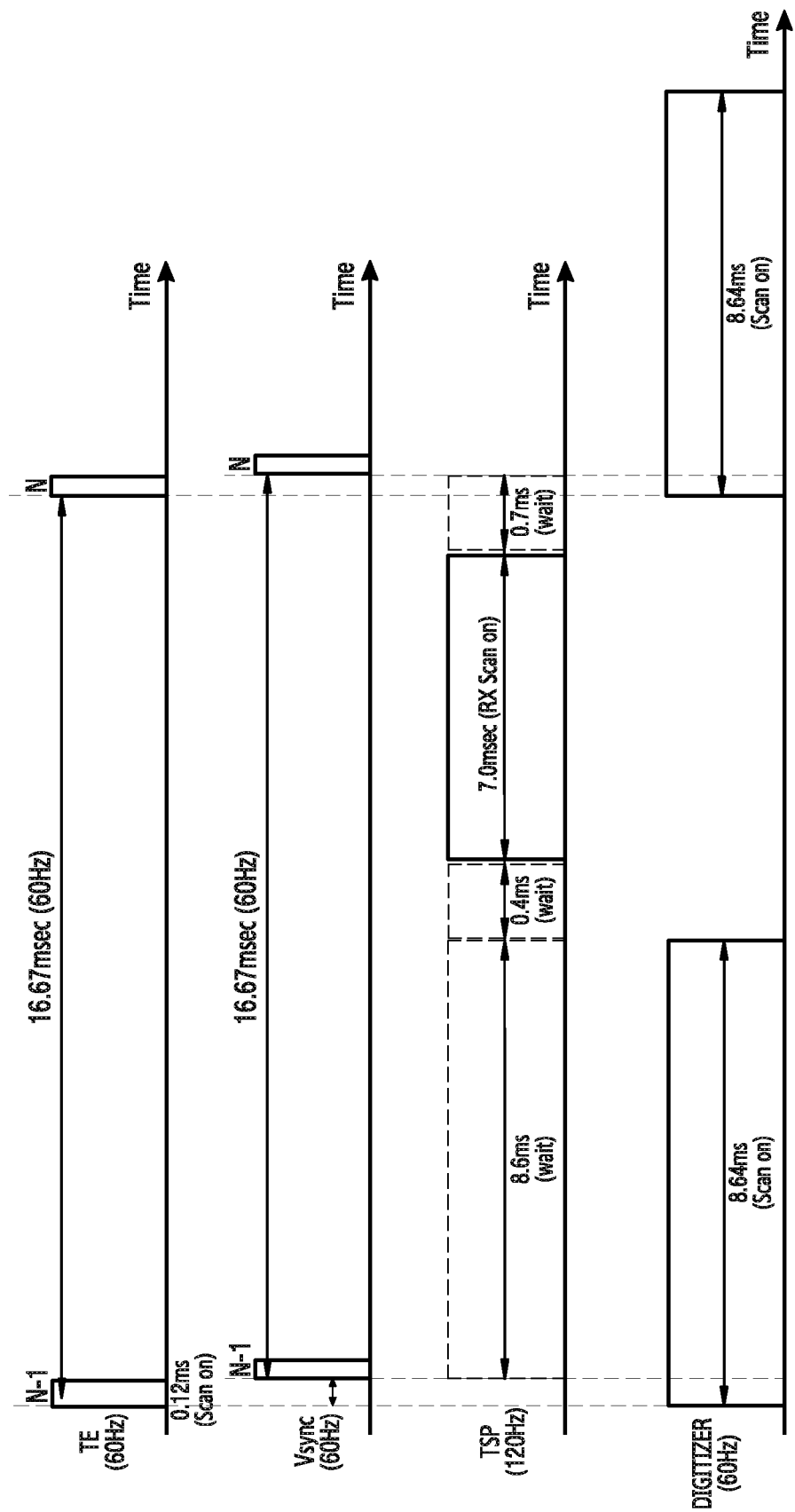
FIG. 3B is a diagram of a method for scanning input sensing panels of an electronic device, according to an embodiment of the present disclosure.

FIG. 3B is a graph showing scan timing when the digitizer sensor 250-3 operates in the global XY mode. When the digitizer sensor 250-3 operates in the global XY mode, the scan time of the digitizer sensor 250-3 may be longer than when the digitizer sensor 250-3 operates in the global mode. The digitizer sensor 250-3 may scan a frequency change of the digitizer panel 223b during 8.64 msec with reference to a TE signal. 8.64 msec is merely an example and does not limit the present disclosure.

Referring to FIG. 3B, it can be seen that, as the scan time of the digitizer sensor 250-3 increases, the scan time of the touch screen sensor 240-3 is reduced.

Figure 3C:
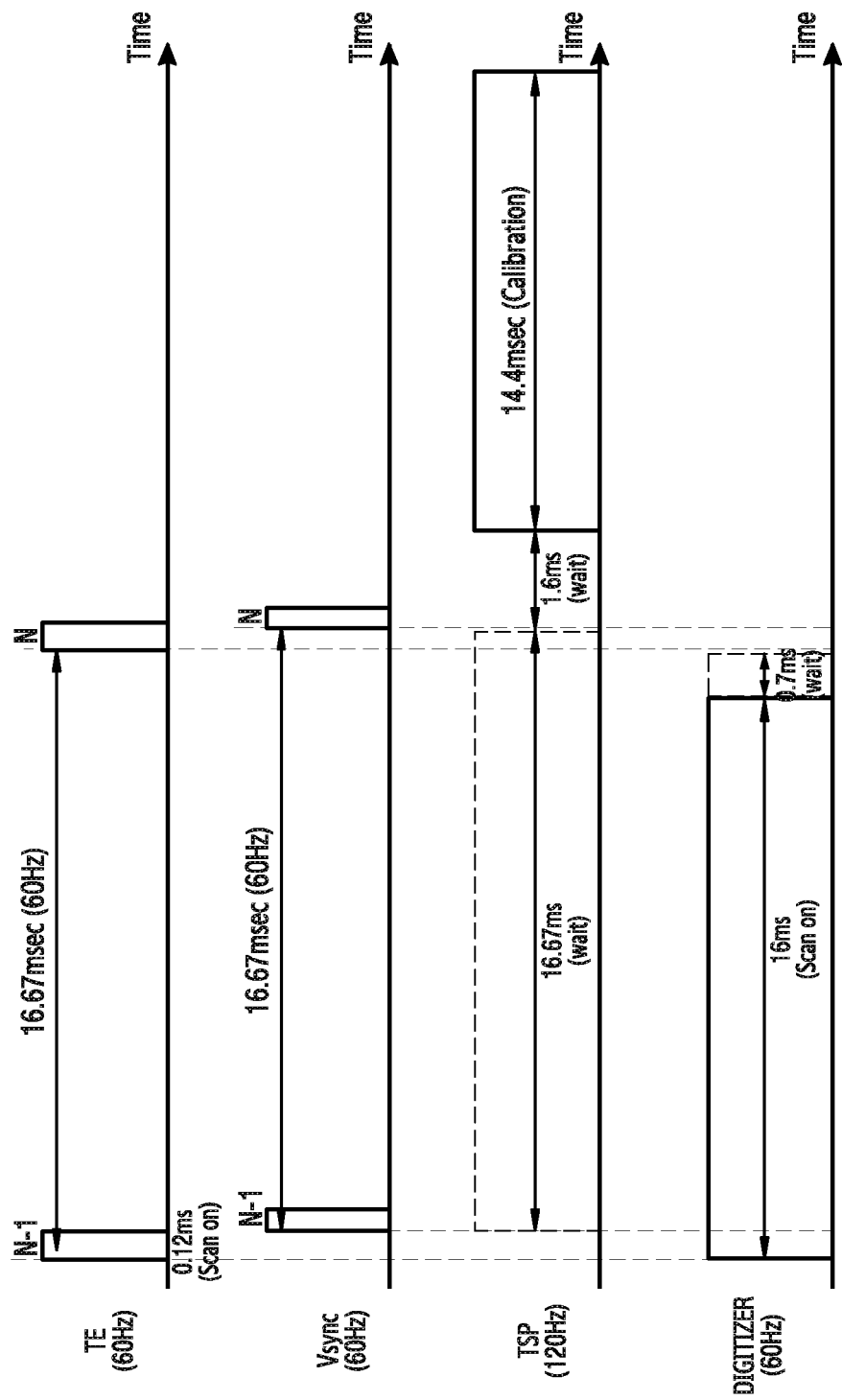
FIG. 3C is a diagram of a method for scanning input sensing panels of an electronic device, according to an embodiment of the present disclosure.
Figure 3D:
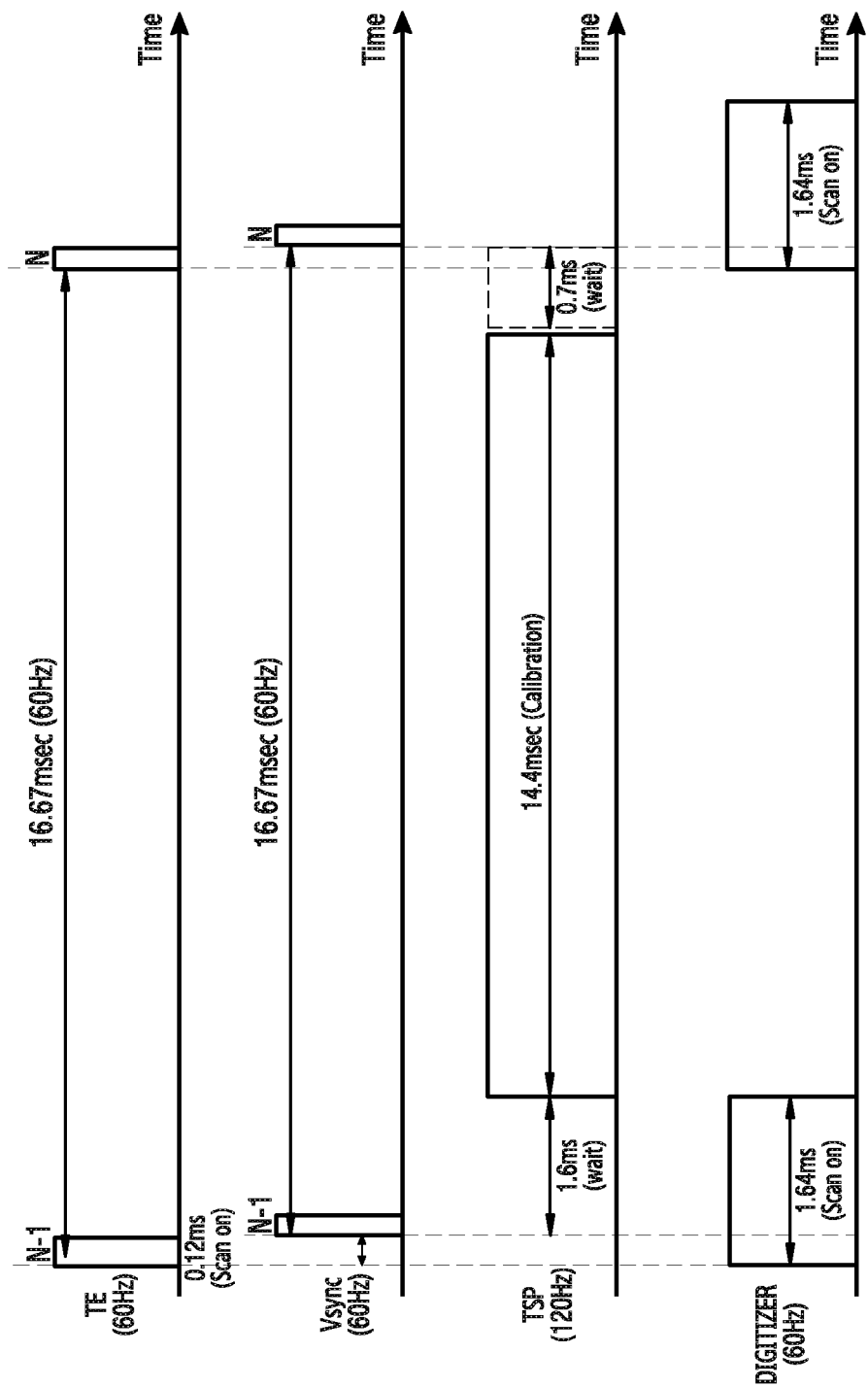
FIG. 3D is a diagram of a method for scanning input sensing panels of an electronic device, according to an embodiment of the present disclosure.

FIGS. 3C and 3D are graphs showing scan timing when the digitizer sensor 250-3 operates in the local scan mode or the full scan mode. When the digitizer sensor 250-3 operates in the local scan mode or full scan mode, the scan time of the digitizer sensor 250-3 may be the same as or similar to a vertical synchronization period. The digitizer sensor 250-3 may scan a frequency change of the digitizer panel 223b during 16.0 msec with reference to the TE signal and may wait 0.7 msec; this is merely an example and does not limit the present disclosure.

When the local scan mode or the full scan mode ends, the touch screen sensor 240-3 may wait as much time as the delay time (e.g., 1.6 msec) with reference to the Vsync, and then may perform calibration during "14.4 msec." The touch screen sensor 240-3 may perform a calibration procedure in the next period after the local scan mode or the full scan mode of the digitizer sensor 250-3 ends. The calibration may be a process of initializing setting values of the touch screen sensor 240-3; this is because a reference electric potential (baseline) of the touch screen sensor 240-3 may be made to fluctuate by the digitizer sensor 250-3.

As shown in FIG. 3C, the digitizer sensor 250-3 may not perform any operation during a delay time of the next period after the local scan mode or the full scan mode ends. Alternatively, as shown in FIG. 3D, the digitizer sensor 250-3 may perform scanning according to the global mode during the delay time of the next period after the local scan mode or the full scan mode ends.

Figure 3E:
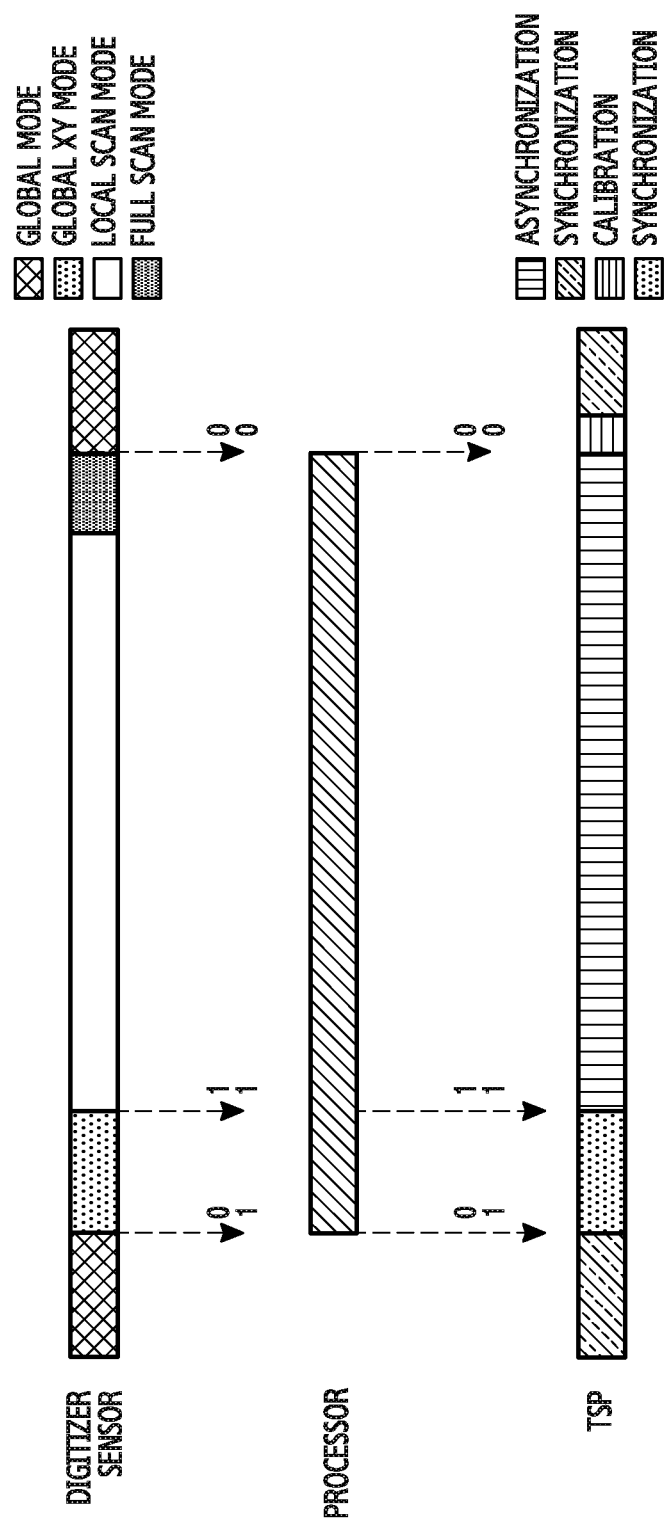
FIG. 3E is a diagram of a scan mode change of input sensing panels, according to an embodiment of the present disclosure.

FIG. 3E is a diagram of a scan mode change of input sensing panels, according to an embodiment of the present disclosure.

The digitizer sensor 250-3 may be changed to the global mode, the global XY mode, the local scan mode, the full scan mode, and the global mode in sequence. The digitizer sensor 250-3 may transmit a scan mode change to the processor 210-3 when the scan mode changes. When the mode is changed to the global XY mode, the digitizer sensor 250-3 may transmit a value of "01" to the processor 210-3. When the mode is changed to the local scan mode or the full scan mode, the digitizer sensor 250-3 may transmit a value of "11" to the processor 210-3. When the mode is changed to the global mode, the digitizer sensor 250-3 may transmit a value of "00" to the processor 210-3; this is merely an example and does not limit the present disclosure.

When the scan mode change of the digitizer sensor 250-3 is received, the processor 210-3 may transmit the first scan command and the second scan command, which are changed in response to the changed scan mode of the digitizer sensor 250-3, to the touch screen sensor 240-3 and the digitizer sensor 250-3, respectively.

When the touch screen sensor 240-3 and the digitizer sensor 250-3 include a storage module and a processing module (as will be described below in FIG. 6), the processor 210-3 may notify the touch screen sensor 240-3 of the changed scan mode of the digitizer. The processor 210-3 may transmit the digital value (for example, "00," "01," "11") corresponding to the scan mode of the digitizer sensor 250-3 to the touch screen sensor 240-3. When the digital value is received, the touch screen sensor 240-3 may change scan timing in response to the changed scan mode of the digitizer.

Figure 4:
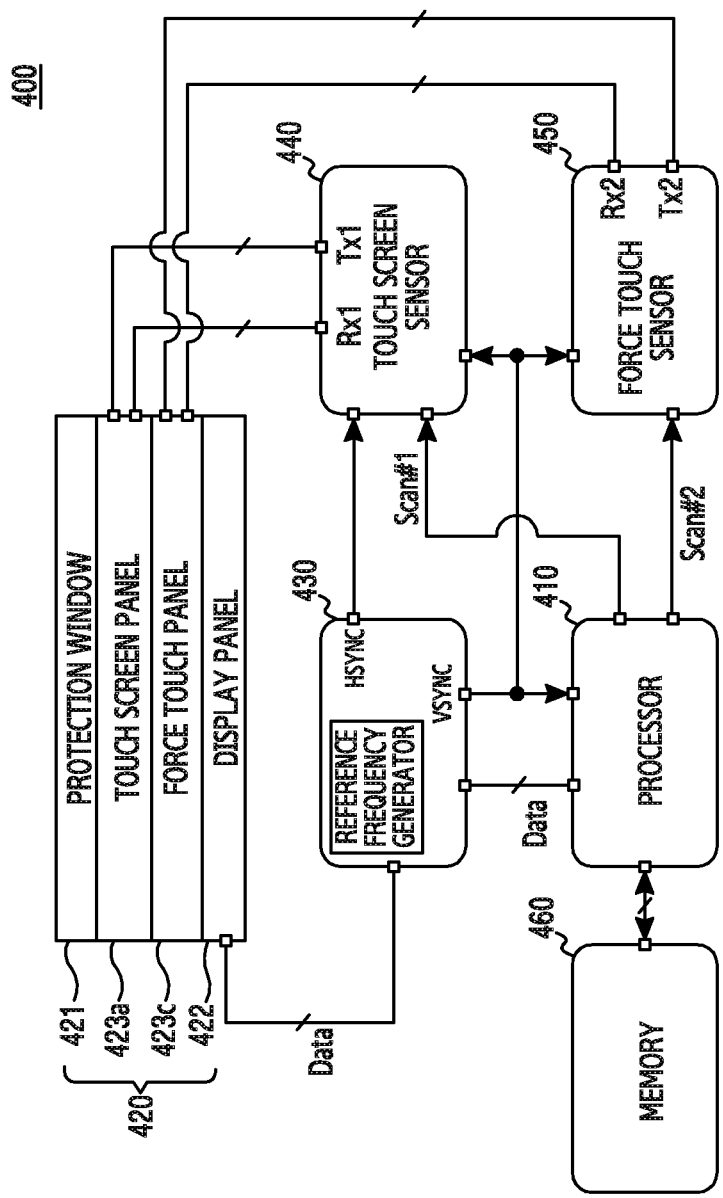
FIG. 4 is a diagram showing a configuration of an electronic device, according to an embodiment of the present disclosure.

FIG. 4 is a diagram of an electronic device, according to an embodiment of the present disclosure.

The electronic device 400 includes a processor 410, a display module 420, a driver IC 430, a touch screen sensor 440, a force touch sensor 450, and a memory 460. The display module 420 may include a protection window 421, a display panel 422, a touch screen panel 423a, and a force touch panel 423c.

The electronic device 400 is similar to the electronic device 201 of FIG. 2A, except that the digitizer sensor 250-1 and the digitizer panel 223b of the electronic device 201 of FIG. 2A are replaced with the force touch sensor 450 and the force touch panel 423c. The touch screen sensor 440 and the force touch sensor 450 of the electronic device 400 may perform respective scan operations according to scan timing which is time-divided with reference to the Vsync.

Although the force touch panel 423c is disposed on the upper end of the display panel 422 in FIG. 4, the present disclosure is not limited to this. For example, the force touch panel 423c may be disposed on the lower end of the display panel 422.

The electronic device 400 may further include a digitizer sensor and a digitizer panel. The touch screen sensor 440, the digitizer sensor, and the force touch sensor 450 of the electronic device 400 may perform respective scan operations according to scan timing which is time-divided with reference to the Vsync.

Figure 5:
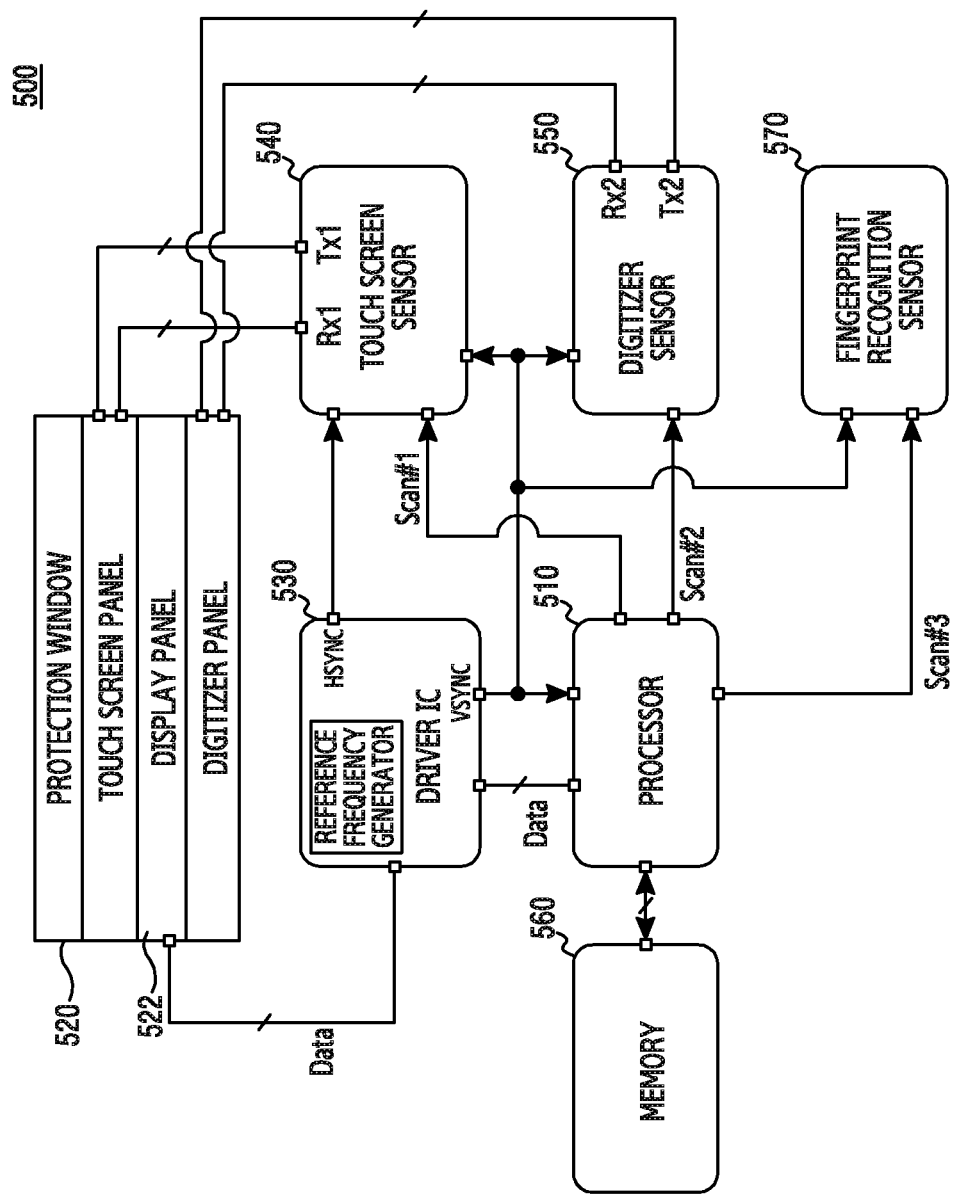
FIG. 5 is a diagram showing a configuration of an electronic device, according to an embodiment of the present disclosure.

FIG. 5 is a diagram of an electronic device, according to an embodiment of the present disclosure.

The electronic device 500 includes a processor 510, a display module 520, a driver IC 530, a touch screen sensor 540, a digitizer sensor 550, a memory 560, and a fingerprint recognition sensor 570. The electronic device 500 may further include the fingerprint recognition sensor 570 in addition to the elements of the electronic device 201 of FIG. 2A.

The fingerprint recognition sensor 570 may be an input sensing sensor of an optical or ultrasonic method. The fingerprint recognition sensor 570 may be disposed adjacent to the display panel 522 (e.g., on the lower end of the display panel 522).

The processor 510 may transmit a first scan command, a second scan command, and a third scan command (Scan #3) to the touch screen sensor 540, the digitizer sensor 550, and the fingerprint recognition sensor 570, respectively, with reference to the Vsync.

The electronic device 500 can prevent malfunction of the fingerprint recognition sensor 570 which may be caused by a harmonic signal which is generated by driving of the display panel 522 and is flowed into the fingerprint recognition sensor 570.

Figure 6:
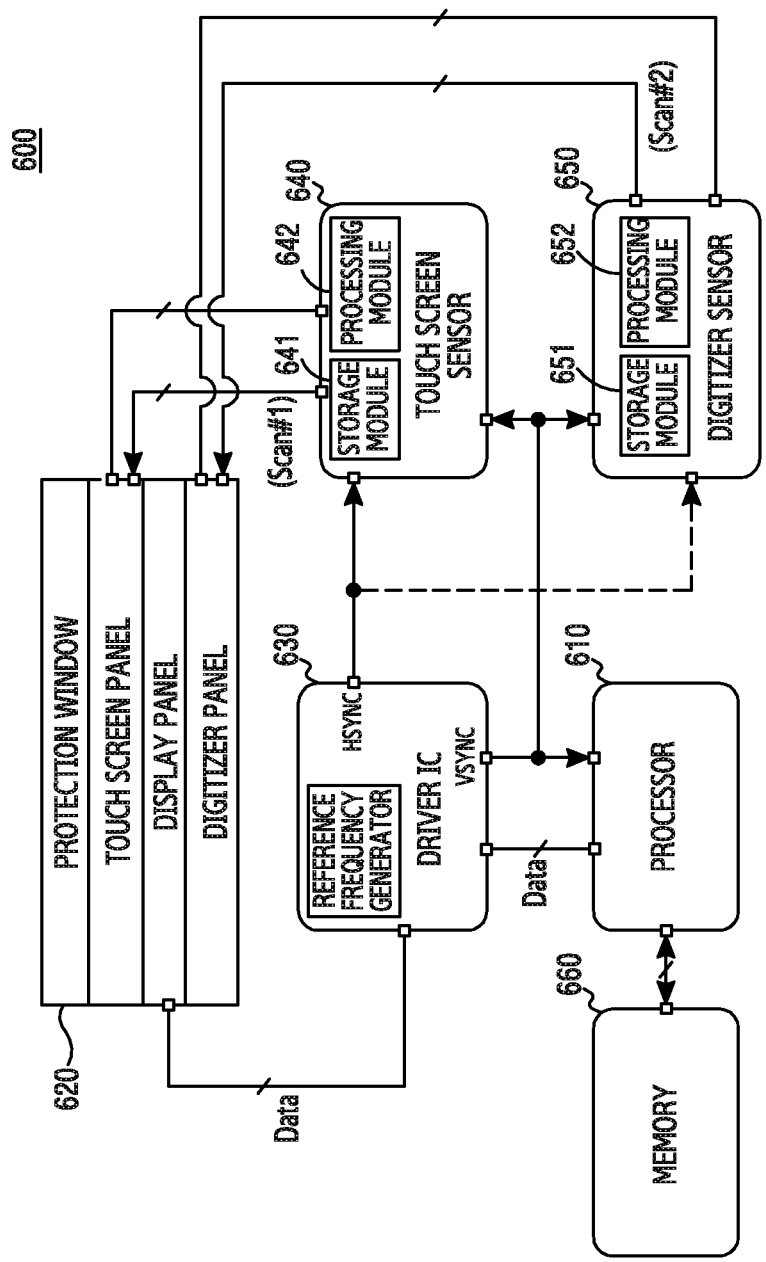
FIG. 6 is a diagram showing a configuration of an electronic device, according to an embodiment of the present disclosure.

FIG. 6 is a diagram of an electronic device, according to an embodiment of the present disclosure.

The electronic device 600 includes a processor 610, a display module 620, a driver IC 630, a touch screen sensor 640, a digitizer sensor 650, and a memory 660.

The touch screen sensor 640 may include a storage module 641 and a processing module 642. The storage module 641 may store setting information for controlling scan timing of the touch screen sensor 640. The storage module 641 may be a ROM. The processing module 642 may perform scanning according to the setting information. The processing module 642 may be a digital signal processor.

The digitizer sensor 650 may include a storage module 651 and a processing module 652. The storage module 651 may store setting information for controlling scanning timing of the digitizer sensor 650, and the storage module 651 may be a ROM. The processing module 652 may perform scanning according to the setting information, and the processing module 652 may be a digital signal processor.

In the above-described electronic device 600, the touch screen sensor 640 and the digitizer sensor 650 rather than the processor 610 may control the scan operations by themselves; the electronic device 600 is similar to the electronic device 201 of FIG. 2A except for this difference.

The digitizer sensor 650 may receive the Hsync from the driver IC 630, and may perform a scan operation with reference to the Hsync.

According to various embodiments of the present disclosure, an electronic device may include a display panel; a plurality of input sensing panels which are layered on or bonded to the display panel; a driver IC which is functionally connected with the display panel to generate a synchronization signal for controlling the display panel; and a plurality of input sensing sensors which are functionally connected with the plurality of input sensing panels to scan the input sensing panels, respectively, according to scan timing which is time-divided with reference to the synchronization signal.

The electronic device further includes a memory configured to store a scan parameter related to the scan timing; and a processor which is functionally connected with the driver IC and the plurality of input sensing sensors, and transmit a scan command according to the scan parameter to each of the input sensing sensors.

Each of the input sensing sensors includes a storage module configured to store a scan parameter related to the scan timing; and a processing module configured to scan a connected input sensing panel according to the scan parameter.

The plurality of input sensing panels include at least two of: a touch screen panel configured to sense a user's finger input; a digitizer panel configured to sense an input of an electronic pen; and a force touch panel configured to sense a force touch, and the plurality of input sensing sensors include at least two of a touch screen sensor configured to sense the user's finger input; a digitizer sensor configured to sense the input of the electronic pen; and a force touch sensor configured to sense the force touch.

The plurality of input sensing sensors further include a fingerprint recognition sensor disposed adjacent to the display panel.

The synchronization signal includes at least one of a horizontal synchronization signal, a vertical synchronization signal, and a tearing effect signal.

The touch screen sensor scans the touch screen panel with reference to the vertical synchronization signal, and the digitizer sensor scans the digitizer panel with reference to the tearing effect signal.

The time-divided scan timing is generated to preferentially scan an input sensing panel that is relatively less influenced by a harmonic signal caused by driving of the display panel from among the plurality of input sensing panels.

At least one of the plurality of input sensing sensors has a plurality of scan modes, and the processor changes the scan timing according to a change of a scan mode of at least one of the plurality of input sensing sensors.

The processor controls, when the changed scan mode is a scan mode which influences a reference electric potential of another input sensing panel, to calibrate the another input sensing panel after the changed scan mode ends.

Figure 7:
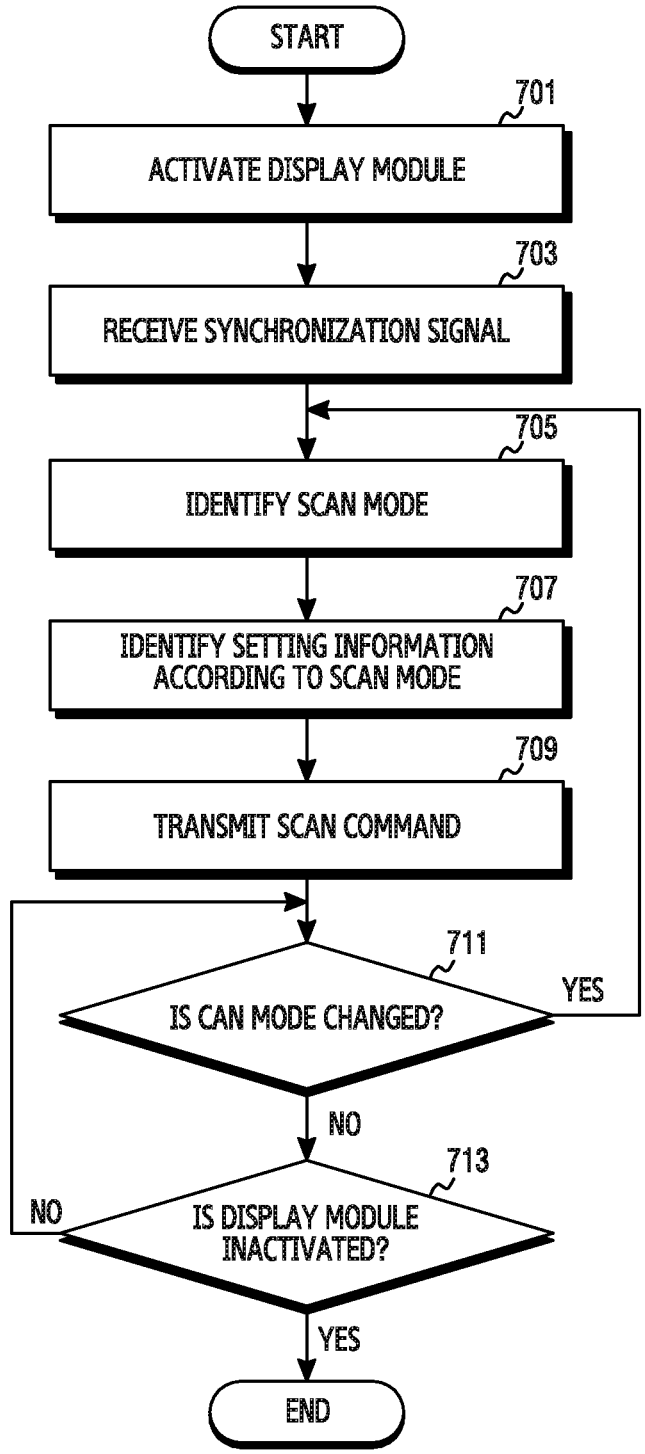
FIG. 7 is a flowchart of a method for operating an electronic device, according to an embodiment of the present disclosure.

FIG. 7 is a sequence diagram of a method for operating of an electronic device, according to an embodiment of the present disclosure.

The processor of the electronic device (e.g., one of the electronic devices previously described) may sense an activation of a display module in operation 701. The display module may be activated when a specific event (e.g., a text message received, a call received, a key pressed, or the like) occurs.

When the activation of the display module is sensed, the processor may receive a synchronization signal in operation 703. The synchronization signal may be at least one of the Vsync, the Hsync, and a TE signal which are generated by a driver IC for controlling the operation of the display panel. In addition, the Vsync may be provided to the display panel and at least one input sensing sensor (e.g., a touch screen sensor, a digitizer sensor, a force touch sensor, a fingerprint recognition sensor). The at least one input sensing sensor which receives the synchronization signal may enter a scan standby mode.

In operation 705, the processor may identify a scan mode regarding each of the at least one input sensing sensor. The processor may identify the scan mode of the input sensing sensor having the plurality of scan modes.

In operation 707, the processor may identify setting information (scan parameter) corresponding to the identified scan mode.

In operation 709, the processor may transmit at least one scan command to the at least one input sensing sensor, respectively. The scan command may be generated to cause the at least one input sensing sensor not to perform a scan operation, simultaneously, by time-dividing one period of the received synchronization signal. The scan command may include a delay time, a scan time, a waiting time, or the like. The at least one input sensing sensor which receives the scan command may perform the scan operation independently.

In operation 711, the processor may determine whether the scan mode of the at least one input sensing sensor is changed or not. When the scan mode of the at least one input sensing sensor is changed, for example, when information (e.g., a digital value) corresponding to the changed scan mode is received from the at least one input sensing sensor, the processor may return to operation 705 to repeat the above-described operations. On the other hand, when the scan mode of the at least one input sensing sensor is not changed, the processor may proceed to operation 713.

In operation 713, the processor may determine whether the display module is requested to be inactivated (e.g., to be turned off). The processor may determine that the display module is requested to be inactivated when a predetermined time (e.g., 30 seconds) elapses without a user input. Alternatively, the processor may determine that the display module is requested to be inactivated when an input of a power key or an input of a gesture which is set to inactivate the display module is sensed. When the display module is not requested to be inactivated, the processor may return to operation 711 to repeat the above-described operation s. On the other hand, when the display module is requested to be inactivated, the processor may inactivate the display module and finish the method of FIG. 7.

When the input sensing sensor does not have the plurality of scan modes or it is not necessary to change scan timing according to a scan mode, operations 705 to 711 may be omitted.

When the input sensing sensors include a storage module and a processing module, operations 705 to 709 may be performed by the at least one input sensing sensor.

Figure 8:
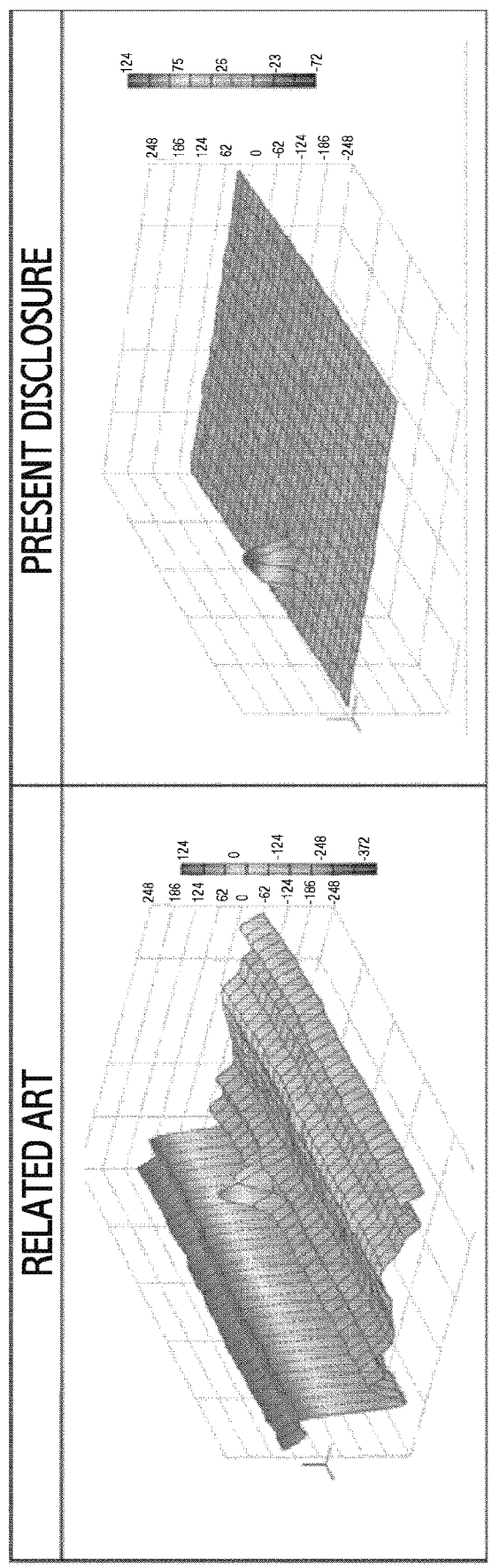
FIG. 8 is a graph showing the results of measuring a change in a reference electric potential of a touch screen panel of an electronic device and a change in a reference electric potential of a touch screen panel of a related-art electronic device, according to an embodiment of the present disclosure.

FIG. 8 is a graph showing the results of measuring a change in a reference electric potential of a touch screen panel of an electronic device and a change in a reference electric potential of a touch screen panel of a related-art electronic device, according to an embodiment of the present disclosure.

Referring to FIG. 8, it can be seen that the reference electric potential of the related-art electronic device is not constant; this is because a harmonic component (e.g., noise) generated by driving of the display panel flows into the touch screen panel. As the reference electric potential fluctuates, the related-art electronic device may malfunction, e.g., detect a ghost touch.

On the other hand, the electronic device according to the present disclosure shows that the reference electric potential is almost constant. As described above, the electronic device, which is synchronized with the Vsync of the display panel and performs scanning, can prevent malfunction.

A method for operating of an electronic device includes sensing an activation of a display module where a display panel and a plurality of input sensing panels are layered or bonded; and scanning the plurality of input sensing panels according to scan timing which is time-divided with reference to a synchronization signal for controlling the display panel.

The scanning includes extracting, by a processor, a scan parameter related to the scan timing from a memory; transmitting, by the processor, a scan command according to the scan parameter to a plurality of input sensing sensors functionally connected with the plurality of input sensing panels; and scanning, by the plurality of input sensing sensors, the plurality of input sensing panels, respectively, according to the scan command.

The scanning includes extracting, by a plurality of input sensing sensors functionally connected with the plurality of input sensing panels, a scan parameter related to the scan timing from an internal storage module; and scanning, by the plurality of input sensing sensors, the plurality of input sensing panels according to the scan parameter.

The plurality of input sensing sensors include at least two of a touch screen sensor configured to sense a user's finger input; a digitizer sensor configured to sense an input of an electronic pen; and a force touch sensor configured to sense a force touch.

The plurality of input sensing sensors further include a fingerprint recognition sensor disposed adjacent to the display panel.

The synchronization signal includes at least one of a horizontal synchronization signal, a vertical synchronization signal, and a tearing effect signal.

The scanning includes scanning the touch screen panel with reference to the vertical synchronization signal; and scanning the digitizer panel with reference to the tearing effect signal.

The scanning includes preferentially scanning an input sensing panel that is relatively less influenced by a harmonic signal caused by driving of the display panel from among the plurality of input sensing panels.

The method further includes determining whether a scan mode of an input sensing panel that has a plurality of scan modes from among the plurality of input sensing panels is changed or not; and changing the scan timing according to the change of the scan mode.

The method further includes calibrating, when the changed scan mode is a scan mode which influences a reference electric potential of another input sensing panel, the another input sensing panel after the changed scan mode ends.

Figure 9:
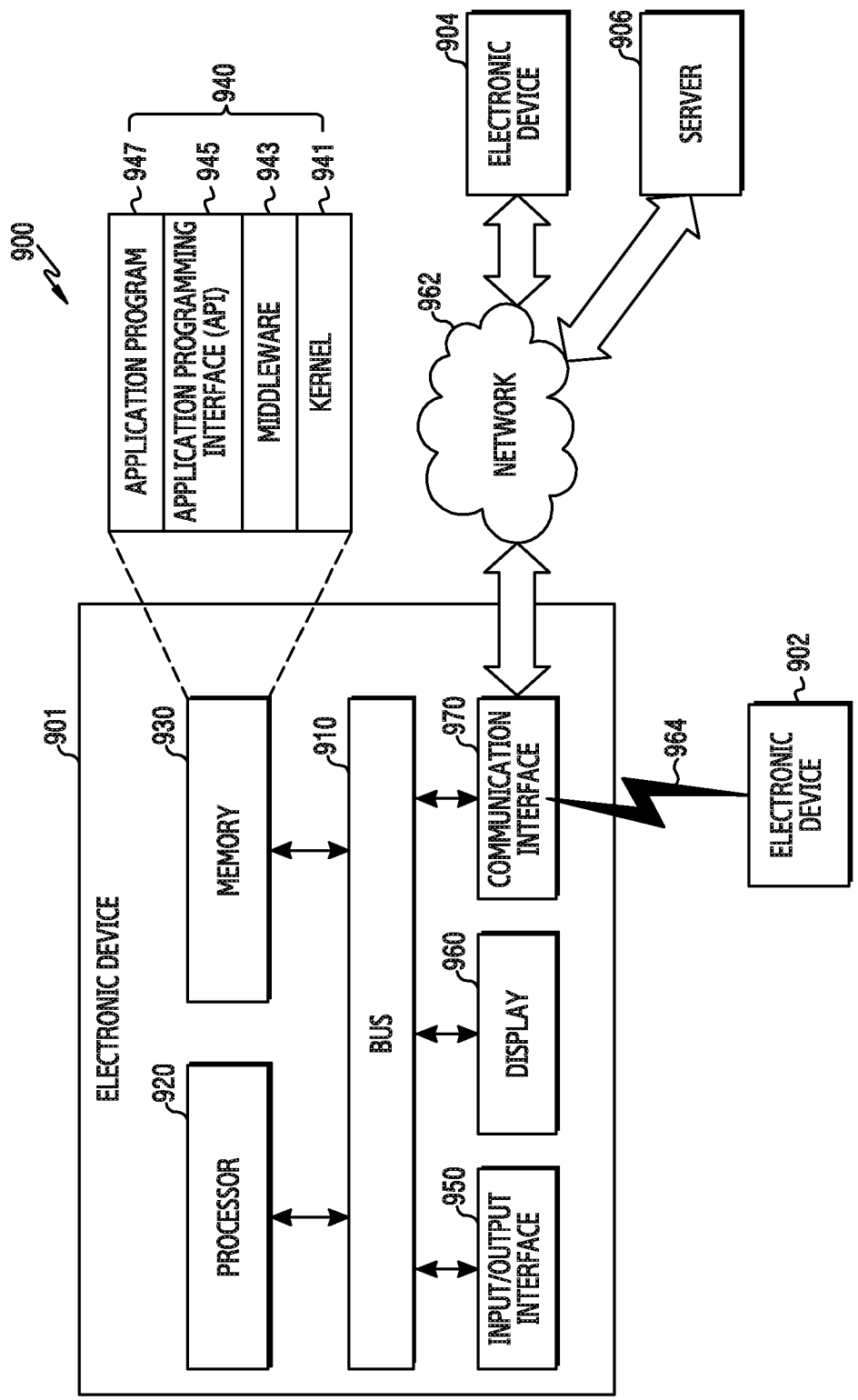
FIG. 9 is a diagram of a network environment including an electronic device, according to an embodiment of the present disclosure.

FIG. 9 is a diagram of a network environment including an electronic device, according to an embodiment of the present disclosure.

An electronic device 901 resides in a network environment 900. The electronic device 901 includes a bus 910, a processor 920, a memory 930, an input/output interface 950, a display 960, and a communication interface 970. The electronic device 901 may be provided without at least one of the components, or may include at least one additional component. The bus 910 can include a circuit for connecting the components 920 through 970 and delivering communication signals (e.g., control messages or data) therebetween. The processor 920 can include one or more of a CPU, an AP, and a CP. The processor 920 can perform an operation or data processing with respect to control and/or communication of at least another component of the electronic device 901.

The memory 930 can include a volatile and/or nonvolatile memory. The memory 930 can store commands or data relating to at least another component of the electronic device 901. The memory 930 can store software and/or a program 940. The program 940 can include, for example, a kernel 941, middleware 943, an Application Programming Interface (API) 945, and/or an application program (application) 947. At least part of the kernel 941, the middleware 943, or the API 945 can be referred to as an OS. The kernel 941 can control or manage system resources (e.g., the bus 910, the processor 920, or the memory 930) used for performing operations or functions implemented by the other programs (e.g., the middleware 943, the API 945, or the application 947). Additionally, the kernel 941 can provide an interface for controlling or managing system resources by accessing an individual component of the electronic device 901 from the middleware 943, the API 945, or the application 947.

The middleware 943 can serve an intermediary role for exchanging data between the API 945 or the application 947 and the kernel 941 through communication. Additionally, the middleware 943 can process one or more job requests received from the application 947, based on their priority. The middleware 943 can assign a priority for using a system resource (e.g., the bus 910, the processor 920, or the memory 930) of the electronic device 901 to at least one of the applications 947, and process the one or more job requests. The API 945, as an interface through which the application 947 controls a function provided from the kernel 941 or the middleware 943, can include at least one interface or function (e.g., an instruction) for file control, window control, image processing, or character control. The input/output interface 950 can deliver commands or data inputted from a user or another external device to other component(s) of the electronic device 901, or output commands or data inputted from the other component(s) of the electronic device 901 to the user or another external device.

The display 960, for example, can include an LCD, an LED display, an OLED display, a microelectromechanical systems (MEMS) display, or an electronic paper display. The display 960 can display various contents (e.g., texts, images, videos, icons, and/or symbols) to the user. The display 960 can include a touch screen and receive touch, gesture, proximity, or hovering inputs by using an electronic pen or a user's body part. The communication interface 970 can set a communication between the electronic device 901 and a first external electronic device 902, a second external electronic device 904, or a server 906. The communication interface 970 can communicate with the second external electronic device 904 or the server 906 over a network 962 through wireless communication or wired communication.

The wireless communication can include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication can include, as shown by an element 964 of FIG. 9, at least one of Wi-Fi, lifi(light fidelity), BT, BT low energy (BLE), Zigbee, NFC, magnetic secure transmission, radio frequency (RF), and body area network (BAN). The wireless communication can include GNSS. The GNSS can include global positioning system (GPS), global navigation satellite system (GLONASS), Beidou navigation satellite system (Beidou), or Galileo, the European global satellite-based navigation system. The GPS can be interchangeably used with the GNSS. The wired communication can include at least one of USB, high definition multimedia interface (HDMI), recommended standard 232 (RS-232), power line communications, and plain old telephone service (POTS). The network 962 can include a telecommunications network at least one of computer network (e.g., local area network (LAN) or wide area network (WAN)), Internet, and telephone network.

Each of the first and second external electronic devices 902 and 904 can be of the same as or of a different type from that of the electronic device 901. All or part of operations executed in the electronic device 901 can be executed by the electronic device 902 or 904, or the server 906. To perform a function or service automatically or by request, instead of performing the function or the service by the electronic device 901, the electronic device 901 can request at least part of a function relating thereto from the electronic device 902 or 904, or the server 906. The electronic device 902 or 904, or the server 906 can perform the requested function or an additional function and send its result to the electronic device 901. The electronic device 901 can provide the requested function or service by processing the received result. In doing so, cloud computing, distributed computing, or client-server computing techniques can be used.

Figure 10:
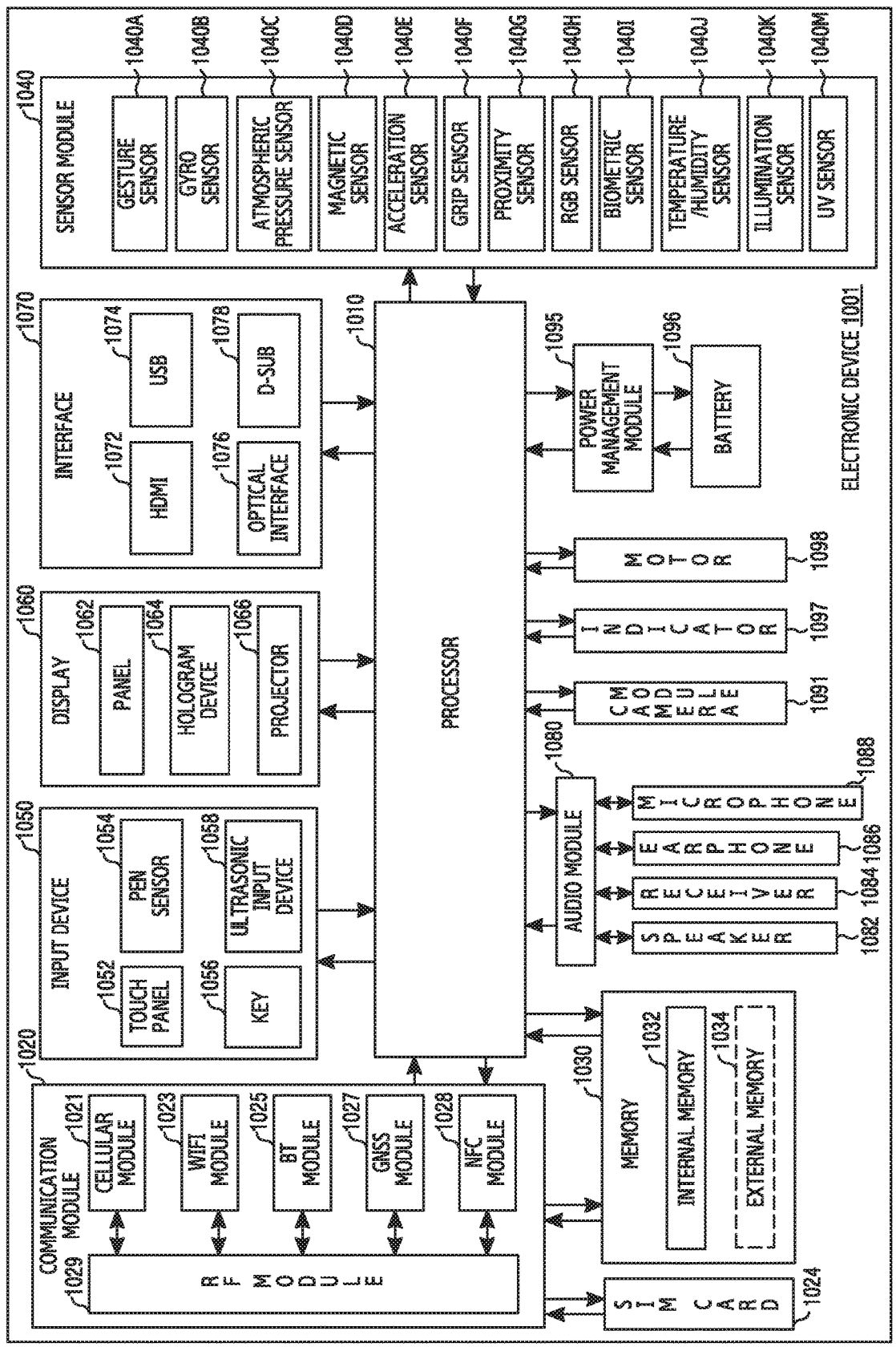
FIG. 10 is a diagram of an electronic device, according to an embodiment of the present disclosure.

FIG. 10 is a diagram of an electronic device 1001, according to an embodiment of the present disclosure. The electronic device 1001 can include all or part of the above-described electronic device 901 of FIG. 9. The electronic device 1001 includes one or more processors (e.g., an AP) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 can control a plurality of hardware or software components connected to the processor 1010, and also can perform various data processing and operations by executing an OS or an application program. The processor 1010 can be implemented with a system on chip (SoC). The processor 1010 can further include a graphic processing unit (GPU) and/or an image signal processor. The processor 1010 may include at least part (e.g., a cellular module 1021) of the components shown in FIG. 10. The processor 1010 can load commands or data received from at least one other component (e.g., a nonvolatile memory) into a volatile memory, process them, and store various data in the nonvolatile memory.

The communication module 1020 can have the same or similar configuration to the communication interface 970 of FIG. 9. The communication module 1020 can include the cellular module 1021, a Wi-Fi module 1023, a BT module 1025, a GNSS module 1027, an NFC module 1028, and an RF module 1029. The cellular module 1021 can provide voice call, video call, short message service (SMS), or Internet service through a communication network. The cellular module 1021 can identify and authenticate the electronic device 1001 in a communication network by using the SIM 1024. The cellular module 1021 can perform at least part of a function that the processor 1010 provides. The cellular module 1021 can further include a CP. At least some (e.g., two or more) of the cellular module 1021, the Wi-Fi module 1023, the BT module 1025, the GNSS module 1027, and the NFC module 1028 can be included in one IC or an IC package. The RF module 1029 can transmit/receive a communication signal (e.g., an RF signal). The RF module 1029 can include a transceiver, a power amp module (PAM), a frequency filter, a low noise amplifier (LNA), or an antenna. At least one of the cellular module 1021, the Wi-Fi module 1023, the BT module 1025, the GNSS module 1027, and the NFC module 1028 can transmit/receive an RF signal through an additional RF module. The SIM 1024, can include a card or be an embedded SIM, and also can contain unique identification information (e.g., an integrated circuit card identifier (ICCID)) or subscriber information (e.g., an international mobile subscriber identity (IMSI)).

The memory 1030 can include at least one of an internal memory 1032 and an external memory 1034. The internal memory 1032 can include at least one of a volatile memory (e.g., dynamic read access memory (RAM) (DRAM), static RAM (SRAM), or synchronous dynamic RAM (SDRAM)), and a non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 1034 can include flash drive, compact flash (CF), secure digital (SD), micro SD, mini SD, extreme digital (xD), multi-media card (MMC), or memory stick. The external memory 1034 can be functionally or physically connected to the electronic device 1001 through various interfaces.

The sensor module 1040 can measure physical quantities or detect an operating state of the electronic device 1001, and thus convert the measured or detected information into electrical signals. The sensor module 1040 can include at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040E a color sensor 1040H (e.g., a red, green, blue (RGB) sensor), a bio sensor 1040I, a temperature/humidity sensor 1040J, an illumination sensor 1040K, and an ultra violet (UV) sensor 1040M. Additionally or alternately, the sensor module 1040 can include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 can further include a control circuit for controlling at least one sensor therein. The electronic device, as part of the processor 1010 or individually, can further include a processor configured to control the sensor module 1040 and thus control the sensor module 1040 while the processor 1010 is sleeping.

The input device 1050 can include at least one of a touch panel 1052, a (digital) pen sensor 1054, a key 1056, and an ultrasonic input device 1058. The touch panel 1052 can use at least one of capacitive, resistive, infrared, and ultrasonic methods. Additionally, the touch panel 1052 can further include a control circuit. The touch panel 1052 can further include a tactile layer to provide a tactile response to a user. The (digital) pen sensor 1054 can include part of a touch panel or a sheet for recognition. The key 1056 can include a physical button, a touch key, an optical key, or a keypad. The ultrasonic input device 1058 can detect ultrasonic waves from an input means through a microphone 1088 and check data corresponding to the detected ultrasonic waves.

The display 1060 can include at least one of a panel 1062, a hologram device 1064, a projector 1066, and/or a control circuit for controlling them. The panel 1062 can be implemented to be flexible, transparent, or wearable. The panel 1062 and the touch panel 1052 can be configured with one or more modules. The panel 1062 can include a pressure sensor (or a force sensor) for measuring a pressure of the user touch. The pressure sensor can be integrated with the touch panel 1052, or include one or more sensors separately from the touch panel 1052. The hologram device 1064 can show three-dimensional images in the air by using the interference of light. The projector 1066 can display an image by projecting light on a screen. The screen can be placed inside or outside the electronic device 1001. The interface 1070 can include an HDMI 1072, a USB 1074, an optical interface 1076, or a D-subminiature (D-sub) 1078. The interface 1070 can be included in the communication interface 970 of FIG. 9. Additionally or alternately, the interface 1070 can include a mobile high-definition link (MHL) interface, a SD card/MMC interface, or an infrared data association (IrDA) standard interface.

The audio module 1080 can convert sounds into electrical signals and convert electrical signals into sounds. At least some components of the audio module 1080 can be included in the input/output interface 950 of FIG. 9. The audio module 1080 can process sound information inputted or outputted through a speaker 1082, a receiver 1084, an earphone 1086, or the microphone 1088.

The camera module 1091, as a device for capturing still images and videos, can include one or more image sensors (e.g., a front sensor or a rear sensor), a lens, an Image signal processor (ISP), or a flash (e.g., an LED or a xenon lamp). The power management module 1095 can manage the power of the electronic device 1001. The power management module 1095 can include a power management IC (PMIC), a charger IC, or a battery gauge.

The PMIC can have a wired and/or wireless charging method. The wireless charging method can include, a magnetic resonance method, a magnetic induction method, or an electromagnetic method, and can further include an additional circuit for wireless charging, for example, a coil loop, a resonant circuit, or a rectifier circuit.

The battery gauge can measure the remaining capacity of the battery 1096, or a voltage, current, or temperature of the battery 1096 during charging. The battery 1096 can include a rechargeable battery and/or a solar battery.

The indicator 1097 can display a specific state of the electronic device 1001 or part thereof (e.g., the processor 1010), for example, a booting state, a message state, or a charging state.

The motor 1098 can convert electrical signals into mechanical vibration and generate a vibration or haptic effect. The electronic device 1001 can include a mobile TV supporting device (e.g., a GPU) for processing media data according to standards such as digital multimedia broadcasting (DMB), digital video broadcasting (DVB), or MediaFlo™.

Each of the above-described components of the electronic device 1001 can be configured with at least one component and the name of a corresponding component can vary according to the kind of an electronic device. The electronic device 1001 can be configured to include at least one of the above-described components or an additional component, or to not include some of the above-described components. Additionally, some of components in an electronic device 1001 are configured as one entity, so that functions of previous corresponding components are performed identically.

Figure 11:
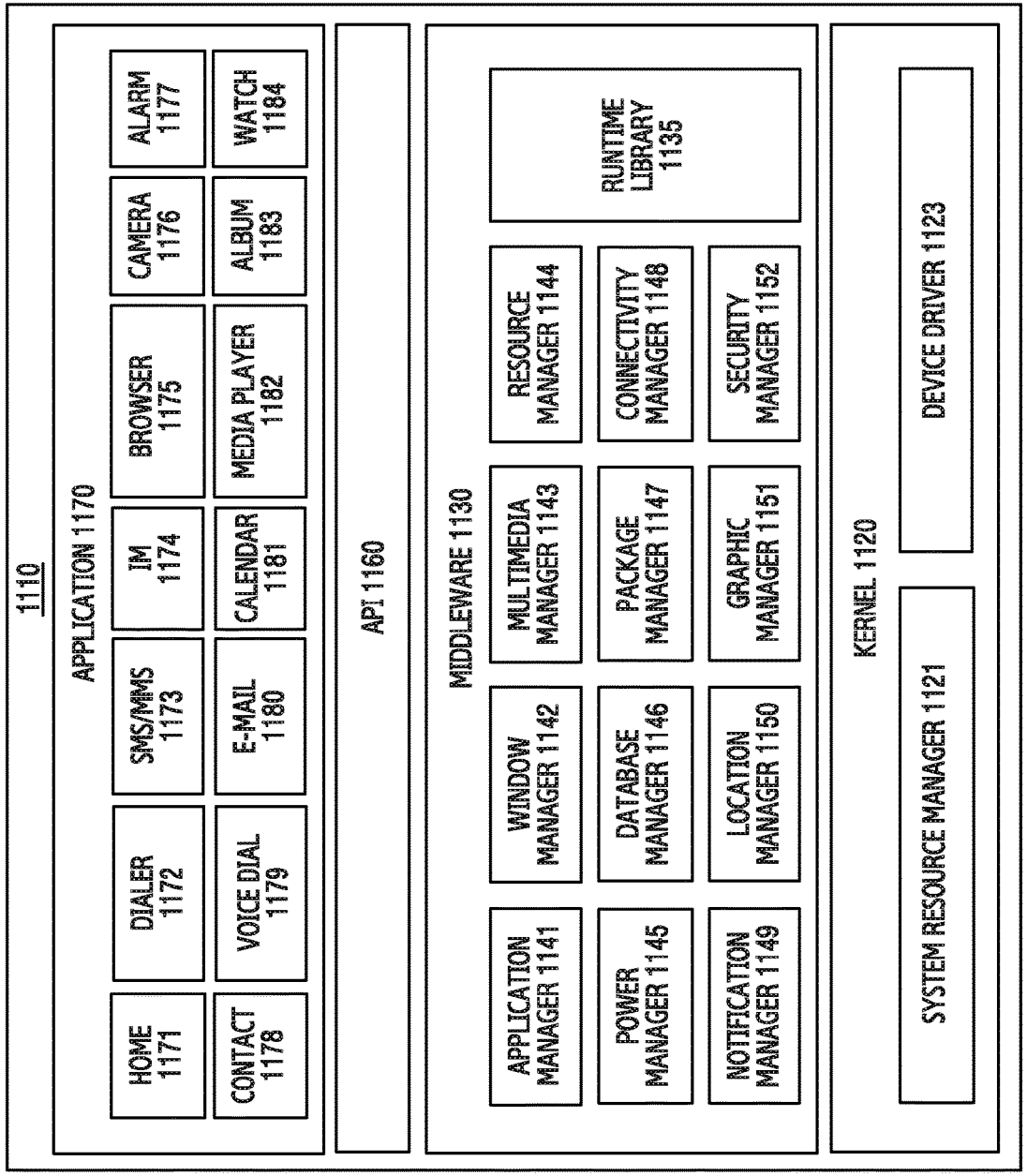
FIG. 11 is a diagram of a program module, according to an embodiment of the present disclosure.

FIG. 11 is a diagram of a program module, according to an embodiment of the present disclosure. A program module 1110 (e.g., the program 940) can include an OS for controlling a resource relating to the electronic device 901 and/or various applications (e.g., the application 947) running on the OS. The OS can include, for example, Android™, iOS™, Windows™, Symbian™, Tizen™, or Bada™.

Referring to FIG. 11, the program module 1110 can include a kernel 1120, a middleware 1130, an API 1160), and/or an application 1170. At least part of the program module 1110 can be preloaded on an electronic device or can be downloaded from the electronic device 902, 904, or the server 906.

The kernel 1120 includes at least one of a system resource manager 1121 and/or a device driver 1123. The system resource manager 1121 can control, allocate, or retrieve a system resource. The system resource manager 1121 can include a process management unit, a memory management unit, or a file system management unit. The device driver 1123 can include a display driver, a camera driver, a BT driver, a sharing memory driver, a USB driver, a keypad driver, a Wi-Fi driver, an audio driver, or an inter-process communication (IPC) driver. The middleware 1130 can provide a function commonly required by the application 1170, or can provide various functions to the application 1170 through the API 1160 in order to allow the application 1170 to efficiently use a limited system resource inside the electronic device.

The middleware 1130 includes at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 can include a library module used by a complier to add a new function through a programming language while the application 1170 is running. The runtime library 1135 can manage input/output, manage memory, or arithmetic function processing. The application manager 1141 can manage the life cycle of the applications 1170.

The window manager 1142 can manage a GUI resource used in a screen. The multimedia manager 1143 can recognize a format for playing various media files and encode or decode a media file by using the codec in a corresponding format. The resource manager 1144 can manage a source code of the application 11740 or a memory space. The power manager 1145 can manage the capacity, temperature, or power of the battery, and determine or provide power information for an operation of the electronic device using corresponding information among the capacity, temperature, and/or power of the battery. The power manager 1145 can operate together with a basic input/output system (BIOS).

The database manager 1146 can create, search, or modify a database used in the application 1170. The package manager 1147 can manage installation or updating of an application distributed in a package file format.

The connectivity manger 1148 can manage a wireless connection. The notification manager 1149 can provide an event, such as incoming messages, appointments, and proximity alerts, to the user.

The location manager 1150 can manage location information of an electronic device. The graphic manager 1151 can manage a graphic effect to be provided to the user or a user interface relating thereto. The security manager 1152 can provide system security or user authentication. The middleware 1130 can include a telephony manager for managing a voice or video call function of the electronic device, or a middleware module for combining various functions of the above-described components. The middleware 1130 can provide a module specialized for each type of OS. The middleware 1130 can dynamically delete part of the existing components or add new components.

The API 1160, as a set of API programming functions, can be provided as another configuration according to the OS. For example, Android™ or iSO™ can provide one API set for each platform, and Tizen™ can provide two or more API sets for each platform.

The application 1170 can include at least one of a home application 1171, a dialer application 1172, an SMS/multimedia messaging system application (MMS) 1173, an instant message (IM) application 1174, a browser application 1175, a camera application 1176, an alarm application 1177, a contact application 1178, a voice dial application 1179, an e-mail application 1180, a calendar application 1181, a media player application 1182, an album application 1183, a clock application 1184, a health care application (e.g., measure an exercise amount or blood glucose level), or environmental information (e.g., air pressure, humidity, or temperature information) provision application.

The application 1170 can include an information exchange application for supporting information exchange between the electronic device and an external electronic device. The information exchange application can include a notification relay application for relaying specific information to the external device or a device management application for managing the external electronic device. The notification relay application can relay notification information from another application of the electronic device to an external electronic device, or receive and forward notification information from an external electronic device to the user. The device management application can install, delete, or update a function (e.g., turn-on/turn off of the external electronic device itself (or some components) or display brightness (or resolution) adjustment) of an external electronic device communicating with the electronic device, or an application operating in the external electronic device.

The application 1170 can include a specified application (e.g., a health care application of a mobile medical device) according to a property of the external electronic device. The application 1170 can include an application received from an external electronic device. At least part of the program module 1110 can be implemented (e.g., executed) with software, firmware, hardware (e.g., the processor 1010), or a combination of at least two of them, and include a module, a program, a routine, a set of instructions, or a process for executing one or more functions.

According to the present disclosure, the malfunction of the input sensing panels can be prevented by minimizing the influence of a harmonic signal generated from the display panel. As described above, the present disclosure can enhance reliability and convenience of a user by preventing the malfunction of the input sensing panels.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an application-specific integrated circuit (ASIC) chip, a field programmable gate arrays (FPGAs), and a programmable-logic device, which are known or will be developed, and which perform certain operations.

At least some parts of a device (e.g., modules or functions thereof) or a method (e.g., operations), described herein, can be implemented with an instruction stored in a non-transitory computer-readable storage medium (e.g., the memory 930) as a program module. When the instruction is executed by a processor (e.g., the processor 920), the processor can perform a function corresponding to the instruction. The non-transitory computer readable recording medium can include a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the present disclosure can be executed in a sequential, parallel, repetitive, or heuristic manner. In addition, some of the operations can be executed in a different order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a display panel;
a plurality of input sensing panels which are one of layered on and bonded to the display panel;
a driver integrated circuit (IC) connected to the display panel and configured to generate a synchronization signal for controlling the display panel; and
a plurality of input sensors connected to the plurality of input sensing panels and configured to scan each of the plurality of input sensing panels at different times, according to scan timing for one scanning period, which is time-divided with reference to the synchronization signal,
wherein the scan timing is generated to firstly scan, during a sub period of the scanning period right after the synchronization signal is generated, an input sensing panel that is less influenced by a harmonic signal caused by driving of the display panel from among the plurality of input sensing panels, and
wherein the scan timing and a number of scanning of each of the plurality of input sensing panels for the scanning period are adaptively changed upon changes of a scan mode of each of the plurality of input sensors during the scan period with reference to the synchronization signal.

2. The electronic device of claim 1, further comprising:
a memory configured to store a scan parameter related to the scan timing; and
a processor connected to the driver IC and the plurality of input sensors and configured to transmit a scan command, according to the scan parameter, to each of the input sensors.

3. The electronic device of claim 2, wherein at least one of the plurality of input sensors has a plurality of scan modes, and wherein the processor is further configured to change the scan timing according to a change of a scan mode of at least one of the plurality of input sensors.

4. The electronic device of claim 3, wherein, when the changed scan mode is a scan mode which influences a reference electric potential of another input sensing panel, the processor is further configured to control to calibrate the another input sensing panel after the changed scan mode ends.

5. The electronic device of claim 1, wherein each of the input sensors comprises:
 a storage configured to store a scan parameter related to the scan timing; and
 a processor configured to scan a connected input sensing panel according to the scan parameter.

6. The electronic device of claim 1, wherein the plurality of input sensing panels comprise at least two of:
 a touch screen panel configured to sense a user's finger input;
 a digitizer panel configured to sense an input of an electronic pen; and
 a force touch panel configured to sense a force touch, and
 wherein the plurality of input sensors comprise at least two of:
 a touch screen sensor configured to sense the user's finger input;
 a digitizer sensor configured to sense the input of the electronic pen; and
 a force touch sensor configured to sense the force touch.

7. The electronic device of claim 6, wherein the plurality of input sensors further comprise a fingerprint recognition sensor disposed adjacent to the display panel.

8. The electronic device of claim 6, wherein the synchronization signal comprises at least one of a horizontal synchronization signal, a vertical synchronization signal, and a tearing effect signal.

9. The electronic device of claim 8, wherein the touch screen sensor is configured to scan the touch screen panel with reference to the vertical synchronization signal, and
 wherein the digitizer sensor is configured to scan the digitizer panel with reference to the tearing effect signal.

10. A method for operating of an electronic device, the method comprising:
 detecting an activation of a display module where a display panel and a plurality of input sensing panels are one of layered and bonded; and
 scanning the plurality of input sensing panels at different times according to scan timing for one scanning period, which is time-divided with reference to a synchronization signal, for controlling the display panel,
 wherein the scan timing is generated to firstly scan, during a sub period of the scanning period right after the synchronization signal is generated, an input sensing panel that is less influenced by a harmonic signal caused by driving of the display panel from among the plurality of input sensing panels, and
 wherein the scan timing and a number of scanning of each of the plurality of input sensing panels for the scanning period are adaptively changed upon changes of a scan mode of each of the plurality of input sensors during the scan period with reference to the synchronization signal.

11. The method of claim 10, wherein scanning the plurality of input sensing panels comprises:
 extracting, by a processor, a scan parameter related to the scan timing from a memory of the electronic device;
 transmitting, by the processor, a scan command according to the scan parameter to a plurality of input sensors connected to the plurality of input sensing panels; and
 scanning, by the plurality of input sensors, the plurality of input sensing panels, respectively according to the scan command.

12. The method of claim 11, wherein the plurality of input sensors comprise at least two of:
 a touch screen sensor configured to sense a user's finger input;
 a digitizer sensor configured to sense an input of an electronic pen; and
 a force touch sensor configured to sense a force touch.

13. The method of claim 12, wherein the plurality of input sensors further comprise a fingerprint recognition sensor disposed adjacent to the display panel.

14. The method of claim 12, wherein the synchronization signal comprises at least one of a horizontal synchronization signal, a vertical synchronization signal, and a tearing effect signal.

15. The method of claim 14, wherein scanning the plurality of input sensing panels comprises:
 scanning the touch screen panel with reference to the vertical synchronization signal; and
 scanning the digitizer panel with reference to the tearing effect signal.

16. The method of claim 10, wherein scanning the plurality of input sensing panels comprises:
 extracting, by a plurality of input sensors connected to the plurality of input sensing panels, a scan parameter related to the scan timing from an internal storage module; and
 scanning, by the plurality of input sensors, the plurality of input sensing panels according to the scan parameter.

17. The method of claim 10, further comprising:
 determining whether a scan mode of an input sensing panel that has a plurality of scan modes from among the plurality of input sensing panels is changed; and
 changing the scan timing according to the change of the scan mode.

18. The method of claim 17, further comprising, when the changed scan mode is a scan mode which influences a reference electric potential of another input sensing panel, calibrating the another input sensing panel after the changed scan mode ends.

* * * * *